(12) United States Patent
Matsunaga et al.

(10) Patent No.: US 6,336,967 B1
(45) Date of Patent: *Jan. 8, 2002

(54) METHOD FOR PROCESSING CHROMIUM OXIDE-CONTAINING SUBSTANCES IN LARGE QUANTITIES, METHOD FOR UTILIZING THE PROCESSED SUBSTANCES, AND PRODUCTS COMPRISING THE PROCESSED SUBSTANCES

(75) Inventors: Hisahiro Matsunaga; Masato Kumagai; Hiroyuki Tobo; Yasuo Kishimoto, all of Chiba; Toshikazu Sakuraya, Tokyo, all of (JP)

(73) Assignee: Kawasaki Steel Corporation, Hyogo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,411

(22) Filed: Mar. 25, 1998

(30) Foreign Application Priority Data

Mar. 27, 1997 (JP) .............................................. 9-075588
Sep. 30, 1997 (JP) .............................................. 9-265623
Sep. 30, 1997 (JP) .............................................. 9-266535

(51) Int. Cl.$^7$ .............................................. C04B 18/14

(52) U.S. Cl. ...................................... 106/789; 588/256

(58) Field of Search ........................... 106/789; 588/256

(56) References Cited

U.S. PATENT DOCUMENTS 4,504,321 A * 3/1985 Kapland et al.
5,304,710 A * 4/1994 Kigel et al.

FOREIGN PATENT DOCUMENTS

| JP | 53-028563 | * | 3/1978 |
| JP | 53-054146 | * | 5/1978 |
| JP | 63-267493 | * | 11/1988 |
| JP | 6-171993 | * | 6/1994 |
| JP | 8-104553 | * | 4/1996 |

* cited by examiner

Primary Examiner—Paul Marcantoni
(74) Attorney, Agent, or Firm—Young & Thompson

(57) ABSTRACT

A method of rapidly reducing chromium oxide-containing slag and the like in large quantities, in a simplified manner and without requiring high temperatures. Chromium oxides are reduced with at least one of elementary sulfur and compounds of sulfur having a valence less than 6. For an aqueous solution of the sulfur component, desirably, its sulfur content is more than 0.03% by weight. As the sulfur source, preferred is blast furnace slag (e.g., non-aged, gradually-cooled blast furnace slag) that is discharged in large quantities in the iron industry. $Cr^{6+}$ in chromium oxides is reduced in one of the following ways: (a) Chromium oxide-containing substances are sprayed with or immersed in blast furnace slag-released water that has been used in cooling blast furnace slag. (b) Chromium oxide-containing substances are mixed with blast furnace slag, and then kept in an air atmosphere. Optionally, the mixture is sprayed with blast furnace slag-released water. (c) Chromium oxide-containing substances are mixed with blast furnace slag, and then steamed. (d) Prior to the reduction treatment, chromium oxide-containing substances are preferably steamed. 100 parts by weight of reduced chromium oxide-containing compounds are mixed with from 0.1 to 90 parts by weight of sulfur-containing slag, and used in various civil engineering works.

6 Claims, 1 Drawing Sheet

FIGURE
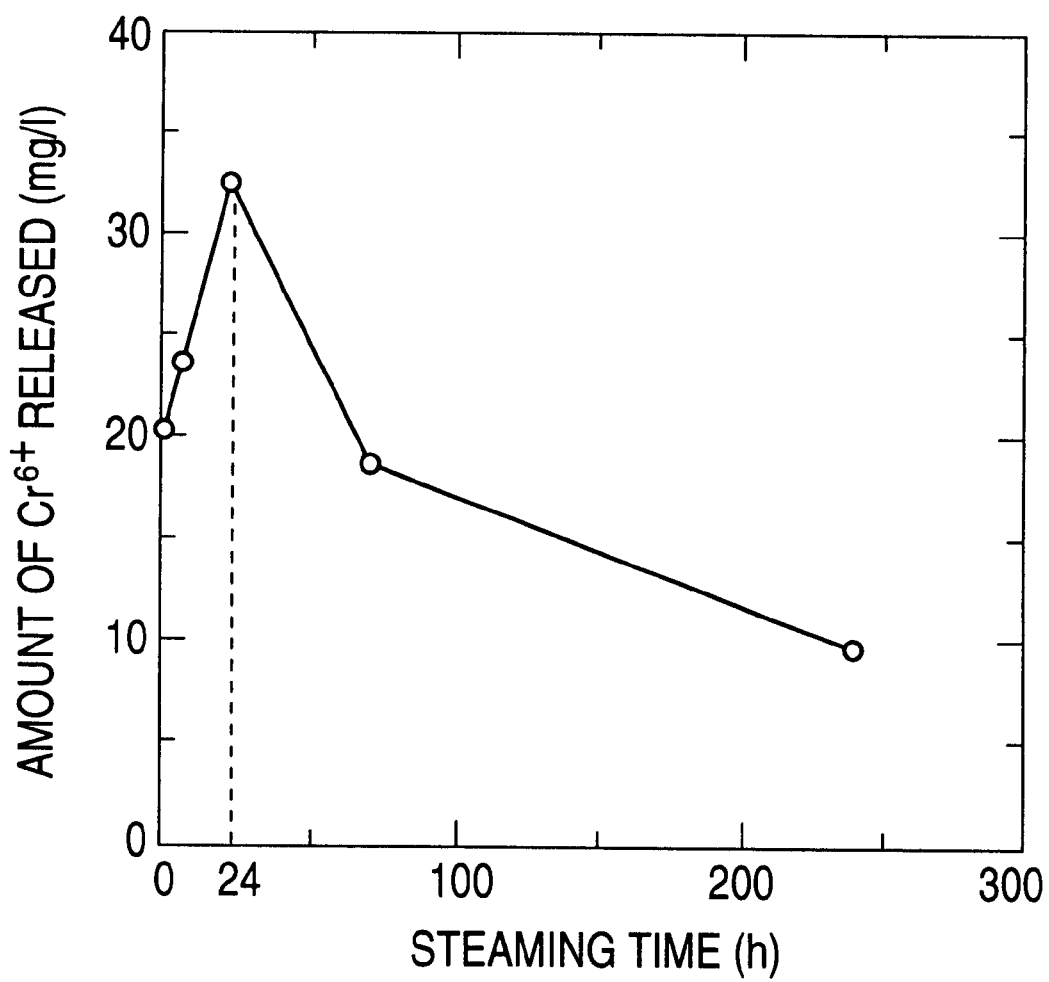

METHOD FOR PROCESSING CHROMIUM OXIDE-CONTAINING SUBSTANCES IN LARGE QUANTITIES, METHOD FOR UTILIZING THE PROCESSED SUBSTANCES, AND PRODUCTS COMPRISING THE PROCESSED SUBSTANCES

FIELD OF THE INVENTION

The present invention relates to a method for processing chromium oxide-containing substances, for example, stainless steel slag as discharged in refining stainless steel, chromium slag as discharged in producing chromium compounds such as sodium bichromate, slag of molten wastes, sewage sludge, slag of molten sewage sludge and the like, thereby to prevent the release of $Cr^{6+}$ from those substances.

BACKGROUND OF THE INVENTION

Stainless steel slag as discharged in refining stainless steel, and chromium slag as discharged in producing chromium compounds such as sodium bichromate, contain chromium oxides at a level of a few %. A part of those chromium oxides is often oxidized to $Cr^{6+}$, depending on the working conditions, and $Cr^{6+}$ is released from them.

Where stainless steel slag and chromium slag are used as materials in roadbeds, materials in temporary works, fillers in civil engineering reclamation works and the like, it is indispensable that $Cr^{6+}$ is not released from the slag.

Recently, recycling of slag as formed by melting ashes from garbage incinerators, sludge and the like in roadbeds, tiles and the like is now under consideration in the industry. However, the slag formed from some types of ashes from garbage incinerators, sludge and the like will often release $Cr^{6+}$ to make it difficult to recycle the slag.

Accordingly, for safely recycling such slag in roadbeds, fillers in civil engineering reclamation works and the like, there have been proposed some new techniques of preventing the release of $Cr^{6+}$ from the slag.

For example, for preventing the release of $Cr^{6+}$ from stainless steel slag, there has been disclosed a method of adding aluminum ash and magnesia-based industrial wastes to stainless steel slag (see Japanese Patent Application Laid-Open (JP-A) No. Hei-6-171993).

When industrially carrying out the disclosed method, the intended aluminum ash and magnesia-based industrial wastes are previously introduced into a slag-receiving kiln, into which molten stainless steel slag is poured, stirred and mixed by the energy of the falling slag melt.

In this method, however, the slag melt is highly viscous, and as to this is different from molten steel, and it is difficult to produce a homogeneously mixed condition by the stirring and mixing means assisted only by the energy of the falling slag melt, resulting in the failure to completely stabilize all chromium oxides in the slag to thereby prevent the release of $Cr^{6+}$ from the slag.

Another method was proposed, of adding a divalent S compound such as FeS or the like to molten slag resulting from decarburizing and refining stainless steel. The resulting slag is then reduced to recover Cr in the slag. The slag is then stirred with an inert gas stream introduced thereinto, thereby making the slag have an S content of not less than 0.20 % by weight so as not to release $Cr^{6+}$ therefrom (see JP-A Hei-8-104553).

In this method, an inert gas stream is introduced into the slag melt to homogeneously mix the slag melt with the additive, thereby stabilizing the chromium oxides existing in the slag. This method is effective in preventing the release of $Cr^{6+}$ from the slag, but requires the troublesome operation of introducing such an inert gas stream into the reduced slag melt while using the additive for lowering the viscosity of the slag melt. Therefore, the method is not economical.

In addition, the method is further troublesome in that, if the additive is added to the slag melt in the refining furnace in order to ensure the homogeneous mixing of the slag melt with the additive, the additive will contaminate the steel melt.

On the other hand, for preventing the release of $Cr^{6+}$ from chromium slag as discharged in producing chromium compounds, a method has been employed of reductionally roasting the slag to thereby reduce $Cr^{6+}$ to $Cr^{3+}$ for rendering the slag harmless. Economically, however, this method is troublesome in that it requires a roasting step.

Sewage sludge is incinerated to reduce its volume prior to being used for reclamation. To prevent the release of $Cr^{6+}$ from the incinerated ashes, a method is used for controlling the air ratio during incineration to be less than 1 (see Journal of the Drainage Works Association of Japan, Vol. 38, No. 378, pp. 29–32, 1994).

However, as pointed out in this publication, it is extremely difficult to ensure the optimum operation for a variety of sludges derived from various sites and having different properties, and the same applies also to the incineration of industrial wastes.

To reduce $Cr^{6+}$ in chromium oxide-containing substances at room temperature, there is generally employed a method using ferrous sulfate as the reducing agent. In this method, however, it is difficult to efficiently lower the $Cr^{6+}$ content of the processed substances to an environmentally acceptable level.

Where chromium oxide-containing substances are reduced or incinerated according to the methods noted above, and the thus-processed substances are recycled in roadbeds, fillers in civil engineering reclamation works, temporary works and the like, they are checked as to whether or not chromium oxides were fully reduced, prior to being shipped. If the processed substances contain non-reduced chromium oxides, they cannot be recycled in roadbeds, fillers in civil engineering reclamation works, temporary works and the like.

OBJECTS OF THE INVENTION

An object of the present invention is to solve the problems in the prior art noted above, and to provide an industrial, simple and economical method for processing chromium oxide-containing substances, such as stainless steel slag, chromium slag, slag of molten wastes, sewage sludge, slag of molten sewage sludge, soil contaminated with chromium oxides and the like, thereby to completely prevent the release of $Cr^{6+}$ from those chromium oxide-containing substances.

Another object of the invention is to provide a method for processing chromium oxide-containing substances such as those mentioned above within a short period of time without significantly increasing the volume of the substances processed to attain the intended results.

Still another object of the invention is to provide a method of recycling chromium oxide-containing substances, and to provide materials for roadbeds, fillers in civil engineering reclamation works, materials for temporary works, materials for civil engineering and construction works, etc.

SUMMARY OF THE INVENTION

Having carefully studied the problems in the prior art noted above, the present inventors have found that, in the prior art in which the defined reduction of chromium is attained in a high-temperature condition for melting, roasting or incineration, the reduction condition is difficult to control and the defined condition is not economical.

On the basis of this finding, we have tried methods of reducing $Cr^{6+}$ at room temperature or at temperatures near room temperature. Specifically, we have made various studies and experiments for reacting various chromium oxide-containing substances such as those mentioned above with different aqueous solutions containing a variety of reducing agents, thereby to reduce $Cr^{6+}$ in those substances.

As a result, we have found that, when water that contains sulfur having a valence less than 6, especially water that contains sulfur ions and sulfur as released from the non-aged material of blast furnace slag, is used, then chromium existing in chromium oxide-containing substances can be reduced with high reactivity in an industrial, simple and economical manner. On the basis of this finding, we have achieved the objects of the present invention.

In addition, based on this finding, we have further studied and have made the following findings [1] to [3]:

[1] Using any of sulfur-containing substances listed below as <1> to <4>, the release of $Cr^{6+}$ from chromium oxide-containing substances is extremely effectively prevented.

<1> Water that has been used for cooling blast furnace slag (hereinafter referred to as blast furnace slag-released water).

<2> Slag containing sulfur and/or compounds of sulfur having a valence less than 6, for example, gradually-cooled blast furnace slag spontaneously aged for less than 3 months (hereinafter referred to as non-aged, gradually-cooled blast furnace slag), slag discharged from the pre-treatment of molten pig iron, etc.

<3> Elemental sulfur, and substances containing elemental sulfur, such as sinter (flowers of sulfur) as recovered from sulfur-containing hot springs and the like (hereinafter referred to as elemental sulfur-containing substances).

<4> Compounds of sulfur having a valence of less than 6, such as sodium thiosulfate, iron sulfide, hydrogen sulfide and the like (hereinafter referred to as compounds of sulfur with a valence of less than 6).

Generically, those substances <1> to <4> set forth above will be hereinafter referred to as sulfur-containing substances.

[2] Using any of those sulfur-containing substances <1> to <4> noted above, the release of $Cr^{6+}$ from chromium oxide-containing substances is extremely effectively prevented according to any of the following processing methods (a) to (d).

(a) They are kept in an aerial atmosphere.
(b) Water is sprayed over them.
(c) Chromium oxide-containing substances are immersed in sulfur-containing substances.
(d) Steam is applied to them.

The above mentioned item (a) is a further surprising new finding. The release $Cr^{6+}$ from chromium oxide-containing substances can be effectively prevented without using such aqueous solutions containing reduction agents as used in the first experiment described on page 6, 2nd and 3rd paragraph in this specification, according to the processing method of mixing the chromium oxide-containing substances with the sulfur-containing slag noted in [1] <2> and then simply leaving the resulting mixture in an air atmosphere.

[3] Using the sulfur-containing substances <1> to <4> optionally combined with any divalent iron-containing substances (hereinafter referred to as Fe(II)-containing substances), such as ferrous sulfate, produces the following advantages (1) and (2).

(1) Even for blast furnace slag-released water having a low concentration of reducing sulfur, of which the concentration may vary in the water, any of the elemental sulfur-containing substances, the compounds of sulfur with a valence less than 6 or the Fe(II)-containing substances may be added thereto or sprayed thereover, and chromium oxide-containing substances to be processed are immersed in the resulting blast furnace slag-released water, whereby $Cr^{6+}$ in the chromium oxide-containing substances can be reduced within a short period of time, resulting in that the release of $Cr^{6+}$ from the thus-processed chromium oxide-containing substances is completely prevented.

(2) Even for slag that releases a large amount of $Cr^{6+}$ according to the metal release test as set forth in Notification No. 46 of the Environment Agency of Japan, or for slag having a low degree of porosity, the chromium oxide-containing substances in the slag of that type may be mixed with any of the elemental sulfur-containing substances, and steam may be applied thereto, whereby the slag can be processed within a short period of time without increasing the volume of the processed slag, resulting in that the release of $Cr^{6+}$ from the chromium oxide-containing substances in the thus-processed slag is completely prevented.

As preferred examples of the sulfur-containing substances having an overall sulfur content of not less than 10 % by weight for sulfur and/or compounds of sulfur having a valence less than 6, there can be mentioned elemental sulfur; elemental sulfur-containing substances such as sinter recovered from sulfur-containing hot springs, etc.; and compounds of sulfur with a valence less than 6 such as sodium thiosulfate, iron sulfide, hydrogen sulfide, etc. These may combined for use in the invention.

Where blast furnace slag-released water is sprayed over chromium oxide-containing substances to be processed therewith, the thus-sprayed substances are preferably kept in an aerial atmosphere to complete the reduction processing.

Also preferably, steam is applied to the chromium oxide-containing substances to be processed according to the invention prior to the intended reduction processing of the substances.

From 0.1 to 90 parts by weight of sulfur-containing slag may be added to and mixed with 100 parts by weight of the reduced, chromium oxide-containing substances to give materials for roadbeds, fillers in civil engineering reclamation works, materials for temporary works, and materials for civil engineering and construction works.

BRIEF DESCRIPTION OF THE DRAWING

FIG. 1 is a graph showing the relationship between the time for steaming stainless steel slag and the amount of $Cr^{6+}$ released from the slag.

DESCRIPTION OF PREFERRED EMBODIMENTS OF THE INVENTION

The invention will be described in detail hereinunder with reference to its preferred embodiments.

The first aspect of the invention is a method of reducing chromium oxide-containing substances, such as chromium oxide-containing slag, sewage sludge, contaminated soil and the like, in large quantities and rapidly. The method of the invention requires neither particularly high temperatures nor specific large-scale equipment.

According to the method of the invention, $Cr^{6+}$ in chromium oxide-containing substances is reduced by a reducing sulfur (at least one of elemental sulfur and sulfur ions having a valence of less than 6, e.g. 2 or 4) at atmospheric temperature or at a temperature of up to about 200° C. when vapor is optionally used. As the method does not use any slag melt, it does not require particularly high temperatures. In other words, according to the method of the invention, chromium oxide-containing substances can be reduced efficiently at low temperatures.

In one preferred embodiment of the method of the invention, chromium oxide-containing substances are kept in contact with an aqueous solution having an overall sulfur content greater than 0.03 % by weight (0.3 g/liter) for sulfur and/or compounds of sulfur having a valence of less than 6 therein.

The present inventors carried out an experiment which is as follows: A reagent of $CrO_3$ was dissolved in pure water to prepare an aqueous solution having a $Cr^{6+}$ content of 100 mg/liter. To 10 liters of the thus-prepared aqueous solution, was added 100 g of non-aged, gradually-cooled blast furnace slag, which had been left for 1 week after having been cooled and ground to have a predetermined grain size, or of the gradually-cooled blast furnace slag that had been spontaneously aged for 6 months, and was shaken for 6 hours, whereupon the $Cr^{6+}$ content of the thus-shaken aqueous solution was measured to determine the decrease (mg) in the $Cr^{6+}$ content of the solution.

The data are shown in Table 1.

In Table 1, the reducibility indicates the decrease (mg) in $Cr^{6+}$ per kg of the gradually-cooled blast furnace slag used.

It is known that the non-aged, gradually-cooled blast furnace slag, depending on its grain size, has a degree of reducibility about 10 to 100 times that of the gradually-cooled blast furnace slag as spontaneously aged for 6 months.

It is also known that slag having a smaller grain size has a higher degree of reducibility.

The reason why the gradually-cooled blast furnace slag has the ability to reduce $Cr^{6+}$ is because the sulfur component existing in the slag dissolves in water to reduce $Cr^{6+}$.

The present inventors carried out another experiment which is as follows: A reagent of $CrO_3$ was dissolved in pure water to prepare an aqueous solution having a $Cr^{6+}$ content of 100 mg/liter. To 10 liters of the thus-prepared aqueous solution, was added 100 g of blast furnace slag-released water containing reducing sulfur having a valence of less than 6 in an amount of 0.5% by weight, and was shaken for 6 hours, whereupon the $Cr^{6+}$ content of the thus-shaken aqueous solution was measured to determine the decrease (mg) in the $Cr^{6+}$ content of the solution.

The data are shown in Table 2.

In Table 2, the reducibility indicates the decrease (mg) in $Cr^{6+}$ per kg of the blast furnace slag-released water used.

Table 2 shows that the blast furnace slag-released water also has the ability to reduce $Cr^{6+}$, which is nearly comparable to that of the non-aged, gradually-cooled blast furnace slag in terms of the value per the unit weight.

In view of this, we clarified the mechanism of action of those reducing substances. Table 3 shows the concentrations of sulfurs of different types in the gradually-cooled blast furnace slag as used for reducing $Cr^{6+}$, before and after the reducing treatment using it.

Comparing the sulfur concentrations before and after the reducing treatment, it is seen that the concentrations of sulfurs except $S^{2-}$ were lowered after the reducing treatment.

In addition, we measured the concentrations of sulfurs of different types in the reduced aqueous solutions, and found that most sulfurs therein were in the form of $SO_4^{2-}$.

Accordingly, it is believed that $S^0$, $S_2O_3^{2-}$ and $SO_4^{2-}$ in the gradually-cooled blast furnace slag dissolve in water, and that of these, $S^0$ and $S_2O_3^{2-}$ are oxidized to $SO_4^{2-}$ while reducing $Cr^{6+}$.

The reason why the ability to reduce $Cr^{6+}$ in the slag powder having a smaller grain size is higher is because the slag powder having a smaller grain size has a larger specific surface area so that the $S^0$ and $S_2O_3^{2-}$ therein are easier to dissolve in water.

The first aspect of the present invention has been completed on the basis of the findings noted above.

According to the invention, when an aqueous solution containing sulfur and/or compounds of sulfur having a valence less than 6 is contacted with chromium oxide-containing substances, it reduces chromium to stable chromium compounds of $Cr(OH)_3$ and the like, whereby the release of chromium oxides from the chromium oxide-containing substances is prevented.

Even if some chromium ions are released from chromium oxide-containing substances and dissolve to the aqueous solution, they are reduced in the aqueous solution so that the release of $Cr^{6+}$ from the chromium oxide-containing substances is prevented.

In the preferred embodiment of the first aspect of the invention, the overall sulfur content of the aqueous solution that contains sulfur and/or compounds of sulfur having a valence less than 6 is desirably larger than 0.03% by weight.

This is because an aqueous solution having an overall sulfur content of not larger than 0.03% by weight for sulfur and/or compounds of sulfur having a valance less than 6 therein takes a few months or longer to reduce chromium oxide-containing substances, and is therefore difficult to use in industrial processes.

As sulfur and/or compounds of sulfur having a valence less than 6, and their sources, which are used in the first aspect of the invention, there are preferred one or more sulfur-containing substances that may be selected from the following items <1> to <4>, which, however, are not limitative. Apart from those mentioned below, any other substances containing sulfur and/or compounds of sulfur having a valence less than 6 are employable herein. In other words, the sources of reducing sulfurs to be used in the invention are not specifically defined, but, for example, may be blast furnace slag that is discharged in large quantities in the iron and steel industry.

<1> Water as used for cooling blast furnace slag (blast furnace slag-released water).

<2> Slag containing sulfur and/or compounds of sulfur having a valence less than 6, for example, gradually-cooled blast furnace slag as spontaneously aged for less than 3 months (non-aged, gradually-cooled blast furnace slag), slag as discharged in the pre-treatment of pig iron melt, etc.

<3>Elemental sulfur, and substances containing elemental sulfur, such as sinter as recovered from sulfur-containing hot springs and the like (elemental sulfur-containing substances).

<4> Compounds of sulfur having a valence less than 6, such as sodium thiosulfate, iron sulfide, hydrogen sulfide and the like (compounds of sulfur with a valence less than 6).

TABLE 1

| Type of Slag | Grain Size (mm) | Reducibility (mg-Cr$^{6+}$/kg-slag) |
|---|---|---|
| Non-aged, Gradually-cooled Blast Furnace Slag(*) | 13.2.–4.75 | 1220 |
| | 4.75–0.425 | 1460 |
| | 0.425–0.075 | 1720 |
| | <0.075 | 2040 |
| Gradually-cooled Blast Furnace Slag as spontaneously aged for 6 months | 132.–4.75 | 15 |
| | 4.75–0.425 | 25 |
| | 0.425–0.075 | 85 |
| | <0.075 | 263 |

Note:
(*)Slag as left for 1 week after having been cooled and ground.

TABLE 2

| Type of Slag-released Water | Grain Size (mm) | Reducibility (mg-Cr$^{6+}$/kg-blast furnace slag-released slag) |
|---|---|---|
| Blast Furnace Slag-released Water(*) | — | 1340 |

Note:
(*)Reducing sulfur content = 0.05% by weight

TABLE 3

| | Before Reducing Treatment (wt. %) | After Reducing Treatment (wt. %) |
|---|---|---|
| S as S$^{2-}$ | 0.04 | 0.04 |
| S as S$^0$ | 0.22 | <0.005 |
| S as S$_2$O$_3^{2-}$ | 0.31 | 0.02 |
| S as SO$_4^{2-}$ | 0.52 | 0.19 |

Based on the first aspect of the invention noted above, the present inventors have further studied and obtained the following findings:

[1] Using any of sulfur-containing substances of the following items <1> to <4>, the release of Cr$^{6+}$ from chromium oxide-containing substances is extremely effectively prevented.

<1> Water as used for cooling blast furnace slag (blast furnace slag-released water).

<2> Slag containing sulfur and/or compounds of sulfur having a valence less than 6, for example, gradually-cooled blast furnace slag as spontaneously aged for less than 3 months (non-aged, gradually-cooled blast furnace slag), slag as discharged in the pre-treatment of pig iron melt, etc.

<3> Elemental sulfur, and sinter as recovered from sulfur-containing hot springs (elemental sulfur-containing substances).

<4> Compounds of sulfur having a valence less than 6, such as sodium thiosulfate, iron sulfide, hydrogen sulfide and the like (compounds of sulfur with a valence less than 6).

[2] Using any of the sulfur-containing substances <1> to <4> noted above, the release of Cr$^{6+}$ from chromium oxide-containing substances is extremely effectively prevented according to any of the following processing methods (1) to (4).

(1) A method of keeping them in an aerial atmosphere. Chromium oxide-containing substances are mixed with slag that contains sulfur and/or compounds of sulfur having a valence less than 6, and the resulting mixture is left in an aerial atmosphere.

(2) A method of spraying water over them.
 (a) Blast furnace slag-released water is sprayed over chromium oxide-containing substances.
 (b) Chromium oxide-containing substances are mixed with slag that contains sulfur and/or compounds of sulfur having a valence less than 6, and water and/or blast furnace slag-released water is sprayed over the resulting mixture.

(3) A method of immersing chromium oxide-containing substances in sulfur-containing substances.
 (a) Chromium oxide-containing substances are immersed in blast furnace slag-released water.
 (b) Chromium oxide-containing substances are immersed in blast furnace slag-released water to which are added substances that contain sulfur and/or compounds of sulfur having a valence less than 6.

(4) A method of applying steam to them.
 (a) Chromium oxide-containing substances are mixed with substances that contain sulfur and/or compounds of sulfur having a valence less than 6, and steam is applied to the resulting mixture.
 (b) Chromium oxide-containing substances are mixed with slag that contains sulfur and/or compounds of sulfur having a valence less than 6, and steam is applied to the resulting mixture.
 (c) Chromium oxide-containing substances are mixed with slag that contains sulfur and/or compounds of sulfur having a valence less than 6 along with substances that contain sulfur and/or compounds of sulfur having a valence less than 6, and steam is applied to the resulting mixture.

[3] Using the sulfur-containing substances <1> to <4> optionally combined with any of divalent iron-containing substances (Fe(II)-containing substances), such as ferrous sulfate, produces the following advantages (1) and (2).

(1) Even for the blast furnace slag-released water <1> having a small concentration of reducing sulfur, of which the concentration may vary in the water <1>, substances that contain sulfur and/or compounds of sulfur having a valence less than 6 may be added thereto, and chromium oxide-containing substances to be processed are immersed in the resulting blast furnace slag-released water, whereby Cr$^{6+}$ in the chromium oxide-containing substances can be reduced within a short period of time, resulting in that the release of Cr$^{6+}$ from the thus-processed chromium oxide-containing substances is completely prevented.

(2) Even for slag that releases a large amount of Cr$^{6+}$ in the metal release test set forth in the Notification No. 46 of the Environment Agency of Japan, or for slag having a low degree of porosity, the chromium oxide-containing substances in the slag of that type, or both the chromium oxide-containing substances therein, and slag that contains sulfur and/or compounds of sulfur having a valence less than 6 may be mixed with substances that contain sulfur and/or compounds of sulfur having a valence less than 6, and steam may be applied thereto, whereby the slag that contains chromium oxide-containing substances can be processed within a short period of time without increasing the volume of the processed slag, resulting in that the release of Cr$^{6+}$ from the chromium oxide-containing substances in the thus-processed slag is completely prevented. Accordingly, in another preferred embodiment of the first aspect of the invention, chromium oxide-containing substances are mixed with slag containing sulfur and/or compounds of sulfur having a valence less than 6, and the resulting mixture is kept in an aerial atmosphere.

In this embodiment, non-aged, gradually-cooled blast furnace slag and/or slag discharged from pre-treatment of molten pig iron are preferred as the slag containing sulfur and/or compounds of sulfur having a valence less than 6, and more preferred is non-aged, gradually-cooled blast furnace slag.

In still another preferred embodiment of the first aspect of the invention, blast furnace slag-released water, which is water as used for cooling blast furnace slag, is sprayed over chromium oxide-containing substances.

In still another preferred embodiment thereof, chromium oxide-containing substances are mixed with slag containing sulfur and/or compounds of sulfur having a valence less than 6, and water and/or blast furnace slag-released water, which is water as used for cooling blast furnace slag, is sprayed over the resulting mixture.

In this embodiment, non-aged, gradually-cooled blast furnace slag and/or slag as discharged from the pre-treatment of molten pig iron are preferred as the slag containing sulfur and/or compounds of sulfur having a valence less than 6, and more preferred is non-aged, gradually-cooled blast furnace slag.

In still another preferred embodiment of the first aspect of the invention, chromium oxide-containing substances are immersed in blast furnace slag-released water, which is water that has been used for cooling blast furnace slag.

In still another preferred embodiment thereof, chromium oxide-containing substances are immersed in blast furnace slag-released water to which are added substances containing sulfur and/or compounds of sulfur having a valence less than 6.

In those embodiments, preferred are sulfur-containing substances having an overall sulfur content of not less than 10% by weight for sulfur and/or compounds of sulfur having a valence less than 6 therein, as the substances containing sulfur and/or compounds of sulfur having a valence less than 6.

The sulfur-containing substances having an overall sulfur content of not less than 10% by weight for sulfur and/or compounds of sulfur having a valence less than 6 therein for use in those embodiments are not specifically defined, but preferred are, for example, elemental sulfur; substances containing elemental sulfur such as sinter as recovered from sulfur-containing hot springs (elemental sulfur-containing substances); and compounds of sulfur having a valence less than 6, such as sodium thiosulfate, iron sulfide, hydrogen sulfide and the like (compounds of sulfur with a valence less than 6). Two or more of these may be used in combination.

As the substances containing compounds of sulfur having a valence less than 6, preferred are those that hardly react with oxygen dissolved in water.

This is because, if sulfur-containing substances that easily react with oxygen dissolved in water are used, they will react with oxygen in water prior to acting on chromium oxide-containing substances, thereby losing their ability to completely reduce $Cr^{6+}$ in the chromium oxide-containing substances.

The reducing sulfur concentration in blast furnace slag-released water varies, depending on the season and the weather, and may be often not more than 0.03% by weight. If blast furnace slag-released water having such a low reducing sulfur concentration is used, it takes a long time to reduce $Cr^{6+}$ in chromium oxide-containing substances.

In view of this, the present inventors have further studied and made various experiments in order to find an effective method capable of processing chromium oxide-containing substances within a short period of time even with blast furnace slag-released water having a low reducing sulfur concentration of not more than 0.03% by weight, thereby completely to prevent the release of $Cr^{6+}$ from the thus-processed chromium oxide-containing substances.

As a result, we have found that, when substances containing sulfur and/or compounds of sulfur having a valence less than 6 are added to blast furnace slag-released water and chromium oxide-containing substances are immersed in the resulting mixture, then the release of $Cr^{6+}$ from the thus-processed chromium oxide-containing substances can be completely prevented, even though the blast furnace slag-released water used has a low reducing sulfur concentration of not more than 0.03% by weight and even though the processing is effected within a short period of time.

Accordingly, even for blast furnace slag-released water having a low reducing sulfur concentration of not more than 0.03% by weight, if substances containing sulfur and/or compounds of sulfur having a valence less than 6 are added thereto, chromium oxide-containing substances may be immersed in the resulting mixture only within a short period of time thereby completely to prevent the release of $Cr^{6+}$ from the thus-processed chromium oxide-containing substances.

The reducing sulfur concentration in blast furnace slag-released water as referred to herein is obtained by subtracting the sulfur content of $SO_4^{2-}$ from the overall sulfur concentration in the water.

According to the preferred embodiment noted above, the substances containing sulfur and/or compounds of sulfur having a valence less than 6 added to blast furnace slag-released water shall control the reducing sulfur concentration in the thus-mixed water, with which, therefore, $Cr^{6+}$ in the chromium oxide-containing substances processed is rapidly reduced.

In this preferred embodiment, the amount of the substances containing sulfur and/or compounds of sulfur having a valence less than 6 to be added to blast furnace slag-released water is preferably so controlled that the reducing sulfur concentration in the blast furnace slag-released water containing those substances is greater than 0.03% by weight.

This is because, if the reducing sulfur concentration in the blast furnace slag-released water used is not more than 0.03% by weight, it is difficult to completely reduce $Cr^{6+}$ in chromium oxide-containing substances with the water within a short period of time.

Also preferably, divalent iron-containing substances such as ferrous sulfate, ferrous chloride and the like (Fe(II)-containing substances) may be added to blast furnace slag-released water for use in the invention.

Adding divalent iron ions to blast furnace slag-released water ensures more rapid and more complete reduction of $Cr^{6+}$ in chromium oxide-containing substances as processed with the divalent iron-containing water.

In still another preferred embodiment of the first aspect of the invention, chromium oxide-containing substances are mixed with substances containing sulfur and/or compounds of sulfur having a valence less than 6, and steam is applied to the resulting mixture.

The present inventors have further studied and made various experiments in order to find an industrial, simple, economical and effective method capable of processing slag that releases $Cr^{+6}$ in an amount of 10 mg/liter or more in the metal release test set forth in the Notification No. 46 of the Environment Agency of Japan, or slag having a degree of porosity of about 5% or lower, within a short period of time without increasing the volume of the processed slag, thereby completely to prevent the release of $Cr^{6+}$ from the thus-processed chromium oxide-containing substances in the slag.

As a result, we have found that, when the slag of that type containing therein chromium oxide-containing substances is mixed with substances containing sulfur and/or compounds of sulfur having a valence less than 6, and steam is applied to the resulting mixture, then the slag can be processed within a short period of time without increasing the volume of the processed slag, resulting in that the release of $Cr^{6+}$ from the chromium oxide-containing substances in the thus-processed slag is completely prevented.

In this embodiment, preferred are sulfur-containing substances having an overall sulfur content of not less than 10% by weight for sulfur and/or compounds of sulfur having a valence less than 6 therein, as the substances containing sulfur and/or compounds of sulfur having a valence less than 6.

This is because the amount to be added of sulfur-containing substances having a larger overall sulfur content of sulfur and/or compounds of sulfur having a valence less than 6, relative to the chromium oxide-containing substances existing in the slag to be processed, may be smaller, resulting in that the increase in the volume of the processed slag may be minimized, that the amount of the steam to be used may be decreased, and that the processed slag is easy to transport.

The sulfur-containing substances having an overall sulfur content of not less than 10% by weight of sulfur and/or compounds of sulfur having a valence less than 6 therein for use in this embodiment are not specifically defined, but preferred are, for example, elemental sulfur; substances containing elemental sulfur such as sinter as recovered from sulfur-containing hot springs (elemental sulfur-containing substances); and compounds of sulfur having a valence less than 6, such as sodium thiosulfate, iron sulfide and the like (compounds of sulfur with a valence less than 6). Two or more of these may be used in combination.

In still another preferred embodiment of the invention, chromium oxide-containing substances are mixed with slag containing sulfur and/or compounds of sulfur having a valence less than 6, and steam is applied to the resulting mixture.

In this embodiment, preferred are non-aged, gradually-cooled blast furnace slag and/or slag discharged from the pre-treatment of molten pig iron, as the slag containing sulfur and/or compounds of sulfur having a valence less than 6; and more preferred is non-aged, gradually-cooled blast furnace slag.

In still another preferred embodiment of the invention, chromium oxide-containing substances are mixed with slag containing sulfur and/or compounds of sulfur having a valence less than 6 and also with sulfur-containing substances containing sulfur and/or compounds of sulfur having a valence less than 6, and steam is applied to the resulting mixture.

In this embodiment, preferred are non-aged, gradually-cooled blast furnace slag and/or slag as discharged from the pre-treatment of molten pig iron melt, as the slag containing sulfur and/or compounds of sulfur having a valence less than 6; and more preferred is non-aged, gradually-cooled blast furnace slag.

In this, also preferred are sulfur-containing substances having an overall sulfur content of not less than 10% by weight for sulfur and/or compounds of sulfur having a valence less than 6, as the substances containing sulfur and/or compounds of sulfur having a valence less than 6.

This is because the amount to be added of sulfur-containing substances having a larger overall sulfur content for sulfur and/or compounds of sulfur having a valence less than 6 may be smaller, resulting in that the increase in the volume of the processed chromium oxide-containing substances may be minimized, that the amount of the steam to be used may be decreased, and that the processed chromium oxide-containing substances are easy to transport.

The sulfur-containing substances having an overall sulfur content of not less than 10% by weight for sulfur and/or compounds of sulfur having a valence less than 6 therein for use in this embodiment are not specifically defined, but preferred are, for example, elemental sulfur; substances containing elemental sulfur such as sinter as recovered from sulfur-containing hot springs (elemental sulfur-containing substances); and compounds of sulfur having a valence less than 6, such as sodium thiosulfate, iron sulfide and the like (compounds of sulfur with a valence less than 6). Two or more of these may be used in combination.

In this embodiment, the steam applied acts on chromium oxide-containing substances to thereby make $Cr^{6+}$ in those substances easily releasable, or that is, make it easily reducible. In this, in addition, sulfur and compounds of sulfur having a valence less than 6 are released from the slag that contains sulfur and/or compounds of sulfur having a valence less than 6, such as gradually-cooled blast furnace slag, and from the sulfur-containing substances that contain sulfur and/or compounds of sulfur having a valence less than 6, and those sulfur and sulfur compounds are oxidized while reducing $Cr^{+6}$ in the chromium oxide-containing substances to $Cr^{3+}$.

Therefore, according to this embodiment in which are combined slag that contains sulfur and/or compounds of sulfur having a valence less than 6, and sulfur-containing substances that contain sulfur and/or compounds of sulfur having a valence less than 6, chromium oxide-containing compounds can be processed within a much shorter period of time even when the amount of the slag added is reduced.

The reducing mechanism in this embodiment is as follows:

When steam is applied to chromium oxide-containing substances having a porosity of 5% or smaller and a grain size of 40 mm or smaller, it takes about 1 day to make 50% of $Cr^{6+}$ in the substances easily releasable, about 2 days to make 80% of $Cr^{6+}$ in the substances easily releasable, and about 3 days to make 100% of $Cr^{6+}$ in the substances easily releasable.

On the other hand, when steam is applied to non-aged, gradually-cooled blast furnace slag, the amount dissolving in water of sulfur with a valence less than 6 in the slag is proportional to the period of time of the steam application, and it takes about 10 days before the entire amount of the sulfur of that type dissolves in water.

On the other hand, the elemental sulfur existing in the slag dissolves in water within about 3 days.

Accordingly, where only non-aged, gradually-cooled blast furnace slag is added to chromium oxide-containing substances, 100% of $Cr^{6+}$ in the substances is made easily releasable, or that is, easily reducible within about 3 days, whilst the releasing speed of sulfur with a valence less than 6 from the slag is low and the sulfur of that type takes 3 days or longer to be released from the slag.

Needlesstosay, if an excess amount of non-aged, gradually-cooled blast furnace slag is added, the processing of chromium oxide-containing substances may be completed within 3 days. However, adding such an excess amount of slag is troublesome in that the volume of the processed substances increases, that the amount of the steam to be applied increases, and that the processed substances are not easy to transport.

On the other hand, if, for example, elemental sulfur only is added as the sulfur-containing substance, it dissolves in water within about 3 days, and its ability to reduce $Cr^{6+}$ lasts for about 3 days.

On the other hand, it takes about 3 days to make 100% of $Cr^{6+}$ in chromium oxide-containing substances having a porosity of 5% or smaller, to which is applied steam, easily releasable, or that is, easily reducible. Therefore, if elemental sulfur only is added to the substances, its ability to reduce $Cr^{6+}$ in the substances is lost before it acts on the substances to completely reduce $Cr^{6+}$ therein.

Taking these facts into consideration, the present inventors tried the combination of non-aged, gradually-cooled blast furnace slag and substances that contains sulfur and/or compounds of sulfur having a valence less than 6, to which was applied steam, resulting in that $Cr^{6+}$ in the chromium oxide-containing substances was completely reduced within a short period of time without significantly increasing the volume of the processed substances.

Specifically, in this embodiment, $Cr^{6+}$ in chromium oxide-containing substances is reduced essentially by the substances that contain sulfur and/or compounds of sulfur having a valence less than 6, such as elemental sulfur, sinter and the like, in the initial stage of 1 to 2 days while steam is applied to the system, and is reduced essentially by the slag that contains sulfur and/or compounds of sulfur having a valence less than 6, such as non-aged, gradually-cooled blast furnace slag and the like, in the final stage of 2 to 3 days while steam is applied thereto.

There follow (I) preferred examples of the slag that contains sulfur and/or compounds of sulfur having a valence less than 6, and those of the blast furnace slag-released water, (II) preferred ranges of the amount to be added of the slag that contains sulfur and/or compounds of sulfur having a valence less than 6, the amount of the blast furnace slag-released water to be sprayed, and the reducing sulfur concentration in the blast furnace slag-released water, and (III) preferred modes of processing chromium oxide-containing substances, which are for the embodiments of the first aspect of the invention mentioned hereinabove.

(I) Preferred examples of slag that contains sulfur and/or compounds of sulfur having a valence less than 6, and those of blast furnace slag-released water:

As the slag that contains sulfur and/or compounds of sulfur having a valence less than 6, which is used in the invention, preferred are non-aged, gradually-cooled blast furnace slag and/or slag as discharged in the pre-treatment of molten pig iron, and more preferred is non-aged, gradually-cooled blast furnace slag. Non-aged, gradually-cooled blast furnace slag:

The non-aged, gradually-cooled blast furnace slag for use in the invention is slag that gives yellowish cloudy water, or that is, slag that colors in the color identification test defined in JIS A5015, Appendix 1. Generally, this is gradually-cooled blast furnace slag as spontaneously aged for less than 3 months.

More preferred is non-aged, gradually-cooled blast furnace slag just having been cooled and ground, or that is, within 1 week after the grinding.

The grain size of the non-aged, gradually-cooled blast furnace slag is not specifically defined, but a fine powdery one having a smaller grain size is better. This is because such fine powdery slag having a smaller grain size has a higher ability to reduce chromium oxides.

More preferred is non-aged, gradually-cooled blast furnace slag, of which the grain size is so defined that the slag is, after having been used for reducing chromium oxides, still effectively usable in industrial products.

In this connection, for example, where stainless steel slag is reduced and is recycled as a material in roadbeds, if fine-powdery, non-aged, gradually-cooled blast furnace slag is used too much as the reducing agent for the stainless steel slag, the reduced slag would no longer satisfy the requirement of the grain size distribution for roadbeds as stipulated in JIS A5015.

Accordingly, in this case, it is desirable to use non-aged, gradually-cooled blast furnace slag of which the grain size satisfies the requirement of the grain size distribution for roadbeds. Slag discharged in the pre-treatment of molten pig iron:

The slag as discharged in the pre-treatment of molten pig iron for use in the invention is one to be discharged in the pre-treatment step of desulfurizing and dephosphorizing molten pig iron before the molten pig iron is transferred into a converter. Blast furnace slag-released water:

The blast furnace slag-released water for use in the invention is preferably one that has been sprayed over non-aged, gradually-cooled blast furnace slag, or one that has been sprayed over hot slag just having been discharged from a blast furnace.

Specifically, as the blast furnace slag-released water for use in the invention, preferred is one that has been sprayed over gradually-cooled blast furnace slag that has been spontaneously aged generally for less than 3 months, or one that has been sprayed over hot slag that has just been discharged from a blast furnace.

Where the blast furnace slag-released water of that type is used, the overall sulfur content of the water, which results from sulfur and/or compounds of sulfur having a valence less than 6, is preferably greater than 0.03% by weight.

This is because, as mentioned hereinabove, blast furnace slag-released water having an overall sulfur content of not more than 0.03% by weight for sulfur and/or compounds of sulfur having a valence less than 6 takes a few months or longer to reduce chromium oxide-containing substances, and is therefore difficult to use in industrial processes.

(II) Preferred ranges of the amount to be added of slag that contains sulfur and/or compounds of sulfur having a valence less than 6, the amount of blast furnace slag-released water to be sprayed, and the reducing sulfur concentration in blast furnace slag-released water, are as follows:

The amount to be added, of the slag that contains sulfur and/or compounds of sulfur having a valence less than 6, the amount of the blast furnace slag-released water to be sprayed, and the reducing sulfur concentration in the blast furnace slag-released water are not specifically defined, but are preferably as follows:

[1] In the embodiment of keeping the reduction system in an aerial atmosphere, in the embodiment of spraying water over the reduction system, and in the embodiment of Introducing steam into the reduction system:

In those embodiments, where the typical blast furnace slag as in Table 3 is used as the slag that contains sulfur and/or compounds of sulfur having a valence less than 6, such as non-aged, gradually-cooled blast furnace slag or the like, it is desirable that the amount of the slag to be added to the reduction system (hereinafter referred to as slag amount), the amount of the blast furnace slag-released water to be sprayed over the system, and the amount to be added thereto of the substances that contain sulfur and/or compounds of sulfur having a valence less than 6 (e.g., elemental sulfur-containing substances, sulfur-containing substances with a valence less than 6) satisfy the following requirements (1) and (2):

$$10 \geq A \geq 0.1 \quad (1)$$

wherein;

$A$=[amount of slag added (wt.pts.)]×10+[amount of blast furnace slag-released water sprayed (wt.pts.)]+[amount added of substances containing sulfur and/or compounds of sulfur having a valence less than 6 (wt.pts.)]×500 (2)

In equation (2), parts by weight (wt.pts.) are all relative to one part by weight of the chromium oxide-containing substances being processed, or to one mg/liter of $Cr^{6+}$ having been released from the processed chromium oxide-containing substances, and all the amounts in (2) are proportional to the amount of the chromium oxide-containing substances being processed and that of $Cr^{6+}$ having been released from the processed chromium oxide-containing substances.

If A in (1) is less than 0.1, outside the defined range, the release of $Cr^{6+}$ from the chromium oxide-containing substances processed is not inhibited sufficiently. On the other hand, even if A is more than 10, also outside the defined range, the saturated effect of the reducing agents used for preventing the release of $Cr^{6+}$ from the processed substances is not enhanced, and the use of such large amounts of the reducing agents is merely wasteful and hence uneconomical.

The amount of water to be sprayed over the mixture comprising chromium oxide-containing substances and non-aged, gradually-cooled blast furnace slag is not specifically defined, but is preferably such that the chromium oxide-containing substances in the mixture may be saturated with the water that has been sprayed thereover.

This is because, when chromium oxides are reduced with non-aged, gradually-cooled blast furnace slag or the like, the sulfur and the compounds of sulfur having a valence less than 6, which have been released from the slag or the like to dissolve in water, act to reduce $Cr^{6+}$ existing in the chromium oxide-containing substances or $Cr^{6+}$ that has been released from the substances to dissolve in water.

[2] In the embodiment of immersing chromium oxide-containing substances in reducing baths:

When chromium oxide-containing substances are immersed blast furnace slag-released water, the reducing sulfur concentration in the water is preferably greater than 0.03% by weight.

This is because, if chromium oxide-containing substances are immersed in blast furnace slag-released water having a reducing sulfur concentration of not more than 0.03% by weight, $Cr^{6+}$ in the substances is difficult to completely reduce within a short period of time.

The reducing sulfur concentration in blast furnace slag-released water as referred to herein is obtained by subtracting the sulfur content of $SO_4^{2-}$ from the overall sulfur concentration in the water.

(III) Preferred modes of processing chromium oxide-containing substances:

In the embodiment of the invention mentioned hereinabove, chromium oxide-containing substances are mixed with slag that contains sulfur and/or compounds of sulfur having a valence less than 6, such as non-aged, gradually-cooled blast furnace slag or the like, and then kept in an air atmosphere.

Also in the other embodiments of the invention where chromium oxide-containing substances are reduced by themselves or after having been mixed with slag that contains sulfur and/or compounds of sulfur having a valence less than 6 optionally along with substances that contain sulfur and/or compounds of sulfur having a valence less than 6, the reduction system is preferably processed in the intended manner while kept in an air atmosphere.

This is because the method of keeping the reduction system in an air atmosphere is the least expensive.

To keep the reduction system in an air atmosphere, for example, it is desirable that the substances to be processed are piled up in heaps in a yard equipped with drainage.

The volume of each heap is not specifically determined and may vary from a few $m^3$ to tens of thousands of $m^3$.

Each heap is preferably not high. This is because too high heaps have a reduced surface area, and water sprayed thereover or rain falling there would find it difficult to spread entirely all through the heaps, resulting in that the reduction of chromium oxides in those heaps takes a long time.

In the embodiment of the invention mentioned hereinabove, where steam is applied to a mixture comprising chromium oxide-containing substances, substances that contain sulfur and/or compounds of sulfur having a valence less than 6, and slag that contains sulfur and/or compounds of sulfur having a valence less than 6, preferably employed is any mode of <1> spraying steam over the heaps of the mixture, <2> introducing steam into the heaps of the mixture, or <3> introducing steam into the heaps of the mixture from below, or even any others.

The temperature of the steam to be applied to the mixture is not specifically defined.

Where steam is applied to the mixture in air, its temperature is generally 100° C. However, where steam is introduced into the heaps of the mixture under high pressure, the boiling point of water will be higher than 100° C. as the inside of the heaps is under increased pressure, resulting in that the temperature of the steam that has been applied to those heaps will increase, depending on the increased pressure. Where steam is introduced under high pressure into the mixture in a closed container, the temperature of the steam applied also increases, depending on the increased pressure, as the boiling point of water is higher than 100° C. under increased pressure. For example, the temperature of steam reaches about 180° C. under 10 atmospheres.

In those embodiments, the steam to be applied to the reduction system is not limited only to water vapor, but may be combined with any other gasses, such as air, $N_2$ and the like.

In the embodiments of the invention mentioned hereinabove, <1> blast furnace slag-released water, <2> slag containing sulfur and/or compounds of sulfur having a valence less than 6, such as non-aged, gradually-cooled blast furnace slag, etc., <3> elemental sulfur-containing substances, and <4> sulfur compounds with a valence less than 6 may be combined with divalent iron-containing substances having the ability to reduce chromium oxides such as those mentioned hereinabove, and any other reducing agents such as activated charcoal and the like.

The invention is applicable not only to stainless steel slag, chromium slag, molten slag of industrial waste, sewage sludge, molten slag of sewage sludge and the like slag, but also to any other substances that may release $Cr^{6+}$, thereby preventing the release of $Cr^{6+}$ from those substances.

Chromium oxide-containing substances to be processed according to the invention may be pre-treated with steam.

When slag that releases $Cr^{6+}$ in an amount of 10 mg/liter or more in the metal release test as set forth in the Notification No. 46 of the Environment Agency of Japan, or slag having a low degree of porosity is processed according to the method of spraying blast furnace slag-released water over the slag or according to the method of immersing the slag in blast furnace slag-released water, it takes a long time to safely stabilize the slag.

On the other hand, when the slag of that type is processed according to the method of applying steam to the slag as mixed with gradually-cooled blast furnace slag, it may be stabilized within a short period of time but its volume increases as this is mixed with gradually-cooled blast furnace slag.

Taking those problems into consideration, the present inventors have further studied and made various experiments, and, as a result, have found that, when steam is previously applied to $Cr^{6+}$-containing slag (chromium oxide-containing substances), $Cr^{6+}$ in the slag can be rendered easily reducible, and that, when the thus pre-treated, $Cr^{6+}$-containing slag is reduced with blast furnace slag-released water, it can be stabilized within a shorter period of time thereby completely to prevent the release of $Cr^{6+}$ from the thus-stabilized slag. In other words, we have found that the pre-treatment with steam shortens the processing time and simplifies the reduction process itself, and that the method comprising the pre-treatment with steam is industrially advantageous and economical.

Specifically, in those preferred embodiments, steam is previously applied to chromium oxide-containing substances, and then the thus pre-treated substances are reduced in the manner mentioned hereinabove. For example, blast furnace slag-released water is sprayed over the pre-treated, chromium oxide-containing substances; or the pre-treated, chromium oxide-containing substances are immersed in blast furnace slag-released water.

These embodiments will be described in more detail hereinafter.

The present inventors have studied and made various experiments in order to find out an industrial, simple, economical and effective method capable of processing slag that releases $Cr^{6+}$ in an amount of 10 mg/liter or more in the metal release test as set forth in the Notification No. 46 of the Environment Agency of Japan, or slag having a low degree of porosity, within a short period of time without increasing the volume of the processed slag, thereby completely to prevent the release of $Cr^{6+}$ from the thus-processed slag.

As a result, we have found that, when steam at a high temperature is applied to the slag of that type, $Cr^{6+}$ existing in the slag can be made easily releasable or easily reducible. We have further found that, when blast furnace slag-released water is sprayed over the thus pre-treated slag or when the thus pre-treated slag is immersed in blast furnace slag-released water, then the slag can be efficiently and economically processed within a short period of time without increasing the volume of the processed slag, whereby $Cr^{6+}$ in the slag is reduced and completely stabilized.

Specifically, according to those preferred embodiments of the invention, where steam is previously applied to chromium oxide-containing slag (chromium oxide-containing substances) and then blast furnace slag-released water is sprayed over the thus pre-steamed slag, or where steam is previously applied to chromium oxide-containing slag (chromium oxide-containing substances) and then the thus pre-steamed slag is immersed in blast furnace slag-released water, $Cr^{6+}$ in the slag can be reduced within a short period of time without increasing the volume of the processed slag. Accordingly, those embodiments of the invention are extremely economical.

FIG. 1 shows the relationship between the time of steaming stainless steel slag, which is one example of chromium oxide-containing substances, and the amount of $Cr^{6+}$ released from the thus-steamed slag.

Briefly, steam at 100° C. was applied to stainless steel slag, from which $Cr^{6+}$ is released, for a predetermined period of time, and thereafter the thus-steamed slag was subjected to the metal release test as set forth in the Notification No. 46 of the Environment Agency of Japan, and the amount of $Cr^{6+}$ released from the slag was measured. The data obtained are plotted relative to the steaming time in FIG. 1.

The slag used in the test had a grain size of from 13.2 to 26.5 mm, and was not ground prior to the test.

As in FIG. 1, the amount of $Cr^{6+}$ released from the slag was greater after the steaming time of 24 hours than that before the steaming at 100° C.

Since steam does not have the ability to oxidize chromium, the test data obtained herein suggest that the steaming at 100° C. makes $Cr^{6+}$ in the slag easily releasable, or that is, easily reducible.

This is because the capillary action of steam applied to the slag will make $Cr^{6+}$ existing in the depth of the slag move to and condense in the surface layer of the slag.

Where steam at 100° C. was applied to the slag for a period of time longer than 24 hours, the amount of $Cr^{6+}$ released from the slag decreased. This is because $Cr^{6+}$ that had been made easily releasable from the slag by the initial steaming was dissolved by the successive steaming and removed.

Accordingly, $Cr^{6+}$ could be completely removed from the slag by continuous steaming for an extremely long period of time, which, however, is not practical.

On the basis of those findings noted above, the present inventors have found a preferred embodiment of the invention wherein $Cr^{6+}$-containing slag is previously steamed thereby to make $Cr^{6+}$ in the slag easily releasable or easily reducible, and thereafter the thus-steamed slag is then reduced with blast furnace slag-released water, for example, water that has been sprayed over non-aged, gradually-cooled blast furnace slag.

The steam to be used in this embodiment is preferably high-temperature steam, but its temperature is not specifically defined.

This is because, when steam is applied to $Cr^{6+}$-containing slag or the like in air, its temperature is generally 100° C., but when steam is introduced under high pressure into a closed container containing therein $Cr^{6+}$-containing slag or the like, the boiling point of water will be higher than 100° C. as the inside of the container is under increased pressure, resulting in that the temperature of the steam having been introduced into the container increases, depending on the increased pressure.

In this embodiment, the steam to be applied to the reduction system is not limited to water vapor only, but may be combined with any other gases, such as air, $N_2$ and the like.

The steaming time is not also specifically defined.

Depending on the grain size and the porosity of the slag to be pre-steamed, the steaming time within which $Cr^{6+}$ existing in the slag is made releasable or reducible may be determined. In most cases, the steaming time may fall between 1 and 120 hours.

The blast furnace slag for use in this embodiment of the invention is preferably non-aged, gradually-cooled blast furnace slag that colors water in the color identification test defined in JIS A5015, Appendix 1. As the blast furnace slag-released water for use therein, in general, preferred is water that has been sprayed over non-aged, gradually-cooled blast furnace slag that has been spontaneously aged for less than 3 months.

For example, preferably used is water that has been sprayed over hot slag that has just been discharged from blast furnaces.

The effectiveness of the blast furnace slag-released water to reduce $Cr^{6+}$ into $Cr^{3+}$ is due to the oxidation of the reducing sulfur of different types ($S^{2-}$, $S^0$, $S_2O_3^{2-}$) that exists in the water.

In this embodiment of the invention, the blast furnace slag-released water to be used may be combined with any other reducing agents having the ability to reduce $Cr^{6+}$.

For example, ferrous sulfate may be dissolved in the blast furnace slag-released water to be used therein.

In this embodiment, the amount of the blast furnace slag-released water to be sprayed over the slag to be reduced, or the time for which the slag to be reduced is immersed in the blast furnace slag-released water, and the ratio of the slag to be reduced to the blast furnace slag-released water in which the slag is immersed are not specifically defined.

The preferred values of those parameters may be suitably determined, depending on the grain size, the porosity and the $Cr^{6+}$ content of the slag to be reduced.

The present invention is especially effectively applied to slag that may release a large amount, for example, 10 mg/liter or more of $Cr^{6+}$, which, however, is not limitative. Needlesstosay, the invention is also effectively applicable to any and every slag that may release a small amount of $Cr^{6+}$.

The invention is applicable not only to $Cr^{6+}$-containing stainless steel slag, chromium slag, industrial wastes, slag of molten wastes and the like, but also to any other substances that may release $Cr^{6+}$, thereby preventing the release of $Cr^{6+}$ from those substances.

As its second aspect, the present invention provides a method of safely recycling chromium oxide-containing substances such as chromium oxide-containing slag.

The present inventors have assiduously studied the problems in the prior art of recycling chromium oxide-containing substances noted hereinabove, and, as a result, have found that, when chromium oxide-containing substances are, after having been reduced, mixed with a predetermined amount of sulfur-containing slag, the release of $Cr^{6+}$ from the resulting mixture is completely prevented, and the mixture can be effectively used in roadbeds, fillers for use in civil engineering reclamation works, temporary works, and the like.

The second aspect of the invention will be described in detail hereinafter.

The method of reducing chromium oxide-containing substances for use in the second aspect of the invention is not specifically defined, provided that it is to reduce $Cr^{6+}$ existing in chromium oxide-containing substances, but is preferably such that the amount of $Cr^{6+}$ released from the reduced chromium oxide-containing substances, when measured according to the metal release test as set forth in the Notification No. 46 of the Environment Agency of Japan, may be not greater than 0.05 mg/liter.

As the reducing method, any of the conventional reducing methods mentioned hereinabove may be employed, but more referred is the method of the first aspect of the invention for reducing chromium oxides noted above.

In the second aspect of the invention, chromium oxide-containing substances are, after having been reduced according to the method noted above, mixed with sulfur-containing slag. In the resulting mixture, the release of $Cr^{6+}$ from the chromium oxide-containing substances is completely prevented, and the mixture is effectively useable in roadbeds, fillers for use in civil engineering reclamation works, temporary works, civil engineering and construction materials, and the like.

As the sulfur-containing slag for use in the second aspect of the invention, preferably used is gradually-cooled and aged blast furnace slag, slag as discharged in the pretreatment of molten pig iron, their mixture, and the like.

The amount of the sulfur-containing slag to be added to the reduced chromium oxide-containing substances is preferably from 0.1 to 90 parts by weight relative to 100 parts by weight of the reduced chromium oxide-containing substances.

When the amount of the sulfur-containing slag added is less than 0.1 part by weight, the complete prevention of the release of $Cr^{6+}$ from the chromium oxide-containing substances will be difficult if the reduction of the chromium oxide-containing substances is incomplete. On the other hand, when the amount of the sulfur-containing slag added is greater than 90 parts by weight, the energy necessary for mixing them will be larger as the amount of the sulfur-containing slag to be handled is larger. Therefore, the addition of such a large amount of sulfur-containing slag is unfavorable from the economical viewpoint.

Regarding the sulfur content of the sulfur-containing slag to be used in the invention, the overall amount of sulfur in the slag, which is the total of elemental sulfur and all sulfur compounds therein, is preferably not less than 0.1% by weight; more preferably, the total of elemental sulfur and compounds of sulfur having a valence less than 6 in the slag is not less than 0.2% by weight.

The reason why adding sulfur-containing slag to reduced chromium oxide-containing substances ensures the complete prevention of the release of $Cr^{6+}$ from the chromium oxide-containing substances is because the sulfur component existing in the sulfur-containing slag will dissolve in water thereby acting to reduce $Cr^{6+}$.

Specifically, it is believed that $S^0$, $S_2O_3^{2-}$ and $SO_4^{2-}$ in the sulfur-containing slag, such as gradually-cooled and aged blast furnace slag, slag as discharged in the pretreatment of molten pig iron or the like, dissolve in water, whereupon $S^0$ and $S_2O_3^{2-}$ are oxidized to $SO_4^{2-}$ while reducing $Cr^{6+}$.

In the invention, the sulfur-containing slag is contacted with the chromium oxide-containing substances in the presence of water, whereupon the slag reduces chromium to a stable chromium compound such as $Cr(OH)_3$ or the like, resulting in that the release of chromium oxides from the chromium oxide-containing substances is completely prevented.

In the invention, the sulfur-containing slag to be added may be combined with any other reducing agents having the ability to reduce chromium compounds, such as iron sulfate, activated charcoal and the like.

The invention will be described more concretely with reference to the following Examples, which, however, are not intended to restrict the scope of the invention.

In the following Examples, the amount of $Cr^{6+}$ released from samples was measured according to the metal release test as described in the Notification No. 46 of the Environment Agency of Japan.

EXAMPLE A1

As chromium oxide-containing substances, herein used were stainless steel slag, chromium slag as discharged during the production of sodium bichromate, and sewage sludge.

The stainless steel slag is produced during reduction in the course of refining stainless steel.

As sulfur-containing substances, used herein were non-aged, gradually-cooled blast furnace slag, gradually-cooled blast furnace slag spontaneously aged for 6 months, and blast furnace slag-released water.

The non-aged, gradually-cooled blast furnace slag is one produced 1 week after cooling and grinding blast furnace slag.

The blast furnace slag-released water is water that has been sprayed over hot blast furnace slag.

The reducing sulfur concentration in the blast furnace slag-released water used herein was 0.05% by weight.

Table 4 shows the chemical compositions of the samples of non-aged, gradually-cooled blast furnace slag, stainless steel slag, chromium slag and sewage sludge tested herein, and the amount of $Cr^{6+}$ released from each sample.

In Table 4, the amount of $Cr^{6+}$ released from each sample of stainless steel slag, chromium slag and sewage sludge was 1.0 mg/liter, 9.7 mg/liter and 0.80 mg/liter, respectively.

Those chromium oxide-containing substances (samples to be reduced) were processed under the different conditions shown in Table 5.

The amount of the non-aged, gradually-cooled blast furnace slag added, which is in Table 5, is in terms of % by weight relative to 100% by weight of each sample to be reduced with it.

In Table 5, there are shown the experimental data obtained along with the conditions employed in the experiments that were conducted.

The sample to be reduced and the non-aged, gradually-cooled blast furnace slag were mixed uniformly.

Each heap of samples was kept in an air atmosphere and weighed about 100 tons and had a height of 2 m.

As seen in Table 5, the amount of $Cr^{6+}$ released from comparative samples A1 to A4 which had been kept in an air atmosphere or had been steamed at 100° C., without adding non-aged, gradually-cooled blast furnace slag thereto, was not lower than the environmentally acceptable standard value of 0.05 mg/liter. This is because no reducing agent was added to those comparative samples.

The amount of $Cr^{6+}$ released from comparative sample A5, to which had been added gradually-cooled blast furnace slag and spontaneously aged for 6 months and which had been kept in an air atmosphere, was also no lower than 0.05 mg/liter.

As to comparative sample A6, stainless steel slag, which was kept in an air atmosphere while spraying thereover city water of the same weight as the slag, there was found no significant difference in the amount of $Cr^{6+}$ released from it before and after the treatment.

In contrast to those comparative samples, samples A1 to A16 of the invention were processed as follows: [1] Each sample was mixed with non-aged, gradually-cooled blast furnace slag, and then kept in an air atmosphere (samples A1 to A4, A10 and A14 of the invention). [2] Each sample was mixed with non-aged, gradually-cooled blast furnace slag, and then kept in an air atmosphere while either one or both of blast furnace slag-released water and ordinary water was sprayed thereover (sample A7, A8, A9, A12 and A16 of the invention). [3] Each sample was immersed in blast furnace-released water (samples A6, A11 and A15 of the invention). [4] Each sample was mixed with non-aged, gradually-cooled blast furnace slag, and high-temperature steam was applied thereto (samples A5 and A13 of the invention). As a result, the amount of $Cr^{6+}$ released from each sample of the invention thus processed was lower than the environmental standard value of 0.05 mg/liter.

As for sample A17, concerning stainless steel slag of the invention, over which was sprayed blast furnace slag-released water of the same weight as that of the slag, the amount of $Cr^{6+}$ released from the thus-processed slag was lower than the environmentally acceptable standard value.

Although the samples, stainless steel slag, chromium slag and sewage sludge, which had been reduced as described herein according to the invention, were kept in an air atmosphere for 1 year, they released no $Cr^{6+}$.

TABLE 4

| | CaO (wt. %) | SiO$_2$ (wt. %) | Al$_2$O$_3$ (wt. %) | MgO (wt. %) | Total S (wt. %) | Total Fe (wt. %) | Total Cr (wt. %) | Water (wt. %) | $Cr^{6+}$ Released (mg/liter)[1] |
|---|---|---|---|---|---|---|---|---|---|
| Non-aged, gradually-cooled blast furnace slag | 42.4 | 34.2 | 13.8 | 7.2 | 1.09 | 0.53 | — | — | — |
| Stainless steel slag | 55.6 | 28.7 | 4.83 | 5.0 | 0.03 | 2.1 | 0.6 | — | 1.0 |
| Chromium slag | 26.8 | 25.7 | 15.2 | 9.8 | 0.82 | 7.0 | 5.2 | — | 9.7 |
| Sewage sludge | 1.2 | 13.3 | 4.9 | 0.5 | 0.6 | 1.2 | 0.3 | 75 | 0.8 |

Note: 1) Metal release test in the Notification No. 46 of the Environment Agency of Japan.

TABLE 5-1

| | Sample Processed | | Non-aged, Gradually-cooled Blast Furnace Slag | | | $Cr^{6+}$ Released (mg/liter)[1] | | |
|---|---|---|---|---|---|---|---|---|
| | Type | Grain Size (mm) | Amount Added (wt. %) | Grain Size (mm) | Processing Method | A[2] | Before Treatment | After Treatment |
| Comparative Sample A1 | stainless steel slag | ~25 | 0 | — | Kept in air atmosphere for 3 months. | 0 | 1.0 | 0.98 |
| Comparative Sample A2 | chromium slag | ~25 | 0 | — | Kept in air atmosphere for 3 months. | 0 | 9.7 | 9.4 |
| Comparative Sample A3 | sewage sludge | ~5 | 0 | — | Kept in air atmosphere for 3 months. | 0 | 0.8 | 0.79 |

TABLE 5-1-continued

| | Sample Processed | | Non-aged, Gradually-cooled Blast Furnace Slag | | | | Cr$^{6+}$ Released (mg/liter)[1] | |
|---|---|---|---|---|---|---|---|---|
| | Type | Grain Size (mm) | Amount Added (wt. %) | Grain Size (mm) | Processing Method | A[2] | Before Treatment | After Treatment |
| Comparative Sample A4 | stainless steel slag | ~25 | 0 | — | Steamed at 100° C. for 24 hours. | 0 | 1.0 | 0.60 |
| Comparative Sample A5 | stainless steel slag | ~25 | 0 | — | 50 wt. % of gradually-cooled blast furnace slag as spontaneously aged for 6 months (grain size: ~25 mm) was added, and kept in air atmosphere for 3 months. | 5.0 | 1.0 | 0.52 |
| Comparative Sample A6 | stainless steel slag | ~25 | 0 | — | Sprayed with city water of the same weight as that of the sample, for 3 months.[3] | 0 | 1.0 | 0.97 |
| Sample A1 of the Invention | stainless steel slag | ~40 | 50 | ~40 | Kept in air atmosphere for 3 months. | 5.0 | 1.0 | <0.05 |
| Sample A2 of the Invention | stainless steel slag | ~25 | 50 | ~25 | Kept in air atmosphere for 3 months. | 5.0 | 1.0 | <0.05 |
| Sample A3 of the Invention | stainless steel slag | ~25 | 25 | ~25 | Kept in air atmosphere for 3 months. | 2.5 | 1.0 | <0.05 |
| Sample A4 of the Invention | stainless steel slag | ~25 | 50 | ~25 | Kept in air atmosphere for 1 month. | 5.0 | 1.0 | <0.05 |
| Sample A5 of the Invention | stainless steel slag | ~25 | 5 | ~25 | Steamed at 100° C. for 24 hours. | 0.5 | 1.0 | <0.05 |
| Sample A6 of the Invention | stainless steel slag | ~25 | 0 | — | Immersed in blast furnace slag-released water of the same weight as that of the sample for 1 week. | 0 | 1.0 | <0.05 |
| Sample A7 of the Invention | stainless steel slag | ~25 | 5 | ~25 | Kept in air atmosphere for 1 month, while being sprayed with blast furnace slag-released water of 0.1 times the weight of the sample.[4] | 0.6 | 1.0 | <0.05 |

Notes:
[1] Metal release test in the Notification No. 46 of the Environment Agency of Japan.
[2] A in formula (1).
[3] While kept in an air atmosphere, this was sprayed 10 times with the determined amount of city water as divided into 10 portions.
[4] The reducing sulfur concentration in the blast furnace slag-released water used was 0.50% by weight. While being kept in an air atmosphere, the sample was sprayed twice with the determined amount of the water as divided into two portions.

TABLE 5-2

| | Sample Processed | | Non-aged, Gradually-cooled Blast Furnace Slag | | | | Cr$^{6+}$ Released (mg/liter)[1] | |
|---|---|---|---|---|---|---|---|---|
| | Type | Grain Size (mm) | Amount Added (wt. %) | Grain Size (mm) | Processing Method | A[2] | Before Treatment | After Treatment |
| Sample A8 of the Invention | stainless steel slag | ~25 | 10 | ~25 | Kept in air atmosphere for 3 months, while being sprayed with water of the same weight as that of the sample.[3] | 1.0 | 1.0 | <0.05 |
| Sample A9 of the Invention | stainless steel slag | ~25 | 7 | ~25 | Kept in air atmosphere for 3 months, while being sprayed with blast furnace slag-released water of 0.1 times the weight of the sample[4] and with water of 0.5 times the weight of the sample.[3] | 0.8 | 1.0 | <0.05 |
| Sample A10 of the Invention | chromium slag | ~25 | 300 | ~25 | Kept in air atmosphere for 3 months. | 3.1 | 9.7 | <0.05 |
| Sample A11 of the Invention | chromium slag | ~25 | 0 | — | Immersed in blast furnace slag-released water of 2 times the weight of the sample, for 1 week. | 0 | 9.7 | <0.05 |
| Sample A12 of the Invention | chromium slag | ~25 | 100 | ~25 | Kept in air atmosphere for 1 month, while being sprayed with blast furnace slag-released water of the same weight as that of the sample.[4] | 1.1 | 9.7 | <0.05 |
| Sample A13 of the Invention | chromium slag | ~25 | 20 | ~25 | Steamed at 100° C. for 72 hours. | 0.2 | 9.7 | <0.05 |
| Sample A14 of the Invention | sewage sludge | ~5 | 50 | ~25 | Kept in air atmosphere for 3 months. | 6.3 | 0.8 | <0.05 |
| Sample A15 of the Invention | sewage sludge | ~5 | 0 | — | Immersed in blast furnace slag-released water of the same weight as that of the sample, for 1 week. | 0 | 0.8 | <0.05 |

TABLE 5-2-continued

| Sample Processed | | Non-aged, Gradually-cooled Blast Furnace Slag | | | | $Cr^{6+}$ Released (mg/liter)[1] | |
|---|---|---|---|---|---|---|---|
| | Type | Grain Size (mm) | Amount Added (wt. %) | Grain Size (mm) | Processing Method | $A^{2)}$ | Before Treatment | After Treatment |
| Sample A16 of the Invention | sewage sludge | ~5 | 5 | ~25 | Kept in air atmosphere for 3 months, while being sprayed with blast furnace slag-released water of 0.1 times the weight of the slag 4) | 0.8 | 0.8 | <0.05 |
| Sample A17 of the Invention | stainless steel slag | ~25 | 0 | — | Sprayed with blast furnace slag-released water of 1.0 times the weight of the sample for 3 months.[3] | 0.1 | 1.0 | <0.05 |

Notes:
[1] Metal release test in the Notification No. 46 of the Environment Agency of Japan.
[2] A in formula (1).
[3] While kept in an air atmosphere, this was sprayed twice with the determined amount of water as divided into 2 portions.
[4] The reducing sulfur concentration in the blast furnace slag-released water used was 0.50% by weight. While being kept in an air atmosphere, the sample was sprayed twice with the determined amount of the water as divided into two portions.

EXAMPLE A2

As chromium oxide-containing substances, there were used herein stainless steel slag, chromium slag discharged during the production of sodium bichromate, slag of molten sewage sludge, and stainless steel slag-adhered refractory waste.

Table 6 shows the chemical compositions of the samples of chromium oxide-containing substances tested herein, the porosity of each sample, and the amount of $Cr^{6+}$ released from each sample.

As in Table 6, the amount of $Cr^{6+}$ released from each sample of stainless steel slag A, stainless steel slag B, stainless steel slag C, chromium slag, slag of molten sewage sludge, and stainless steel slag-adhered refractory waste was 6.50 mg/liter, 32.7 mg/liter, 13.2 mg/liter, 25.3 mg/liter, 0.8 mg/liter and 0.12 mg/liter, respectively.

The porosity of each sample of stainless steel slag A, stainless steel slag B, stainless steel slag C, chromium slag, and slag of molten sewage sludge was 18%, 25%, 4%, 10% and 8%, respectively.

Stainless steel slag is generally discharged from a converter, after having been reduced. However, the samples of stainless steel slag used herein were not reduced prior to being discharged.

As sulfur-containing substances, used herein were non-aged, gradually-cooled blast furnace slag, elemental sulfur, and sinter.

The non-aged, gradually-cooled blast furnace slag was sampled within 1 week after having been cooled and ground.

Those slag samples to be reduced were steamed under various conditions shown in Table 7.

In Table 7 are shown the experimental data obtained long with the conditions employed.

As for comparative sample A8, stainless steel slag A, in Table 7, to which was added 10% by weight of non-aged, gradually-cooled blast furnace slag and which was steamed for 2 days, the amount of $Cr^{6+}$ released from the processed slag A was reduced, but still was not less than 0.05 mg/liter.

As for comparative sample A9, stainless steel slag B, to which was added 10% by weight of non-aged, gradually-cooled blast furnace slag and which was steamed for 3 days, the amount of $Cr^{6+}$ released from the processed slag B was reduced, but still was not less than 0.05 mg/liter.

As opposed to those comparative samples, the amount of $Cr^{6+}$ released from samples A18 to A26 of the invention, to which had been added a small amount of a sulfur-containing substance having a high sulfur content and which had been steamed for 3 days or shorter, was less than 0.05 mg/liter.

As for comparative sample A10, stainless steel slag C, to which was added 20% by weight of non-aged, gradually-cooled blast furnace slag and which was steamed for 3 days, the amount of $Cr^{6+}$ released from the processed slag C was reduced, but still was not less than 0.05 mg/liter. As opposed to this comparative sample, the amount of $Cr^{6+}$ released from sample A25 of the invention, to which had been added 5% by weight of non-aged, gradually-cooled blast furnace slag and 1% by weight of sulfur and which had been steamed for 3 days, was less than 0.05 mg/liter.

TABLE 6

| | Cao (wt. %) | $SiO_2$ (wt. %) | $Al_2O_3$ (wt. %) | MgO (wt. %) | Total S (wt. %) | Total Fe (wt. %) | Total Cr (wt. %) | Porosity (%) | $Cr^{6+}$ Released (mg/liter)[1] |
|---|---|---|---|---|---|---|---|---|---|
| Stainless steel slag A | 57.0 | 20.4 | 3.8 | 4.9 | 0.03 | 3.6 | 4.5 | 18 | 6.50 |
| Stainless steel slag B | 61.3 | 17.5 | 2.8 | 2.6 | 0.03 | 4.3 | 6.2 | 25 | 32.7 |
| Stainless steel slag C | 58.3 | 18.8 | 3.3 | 2.5 | 0.03 | 4.2 | 5.5 | 4 | 13.2 |
| Chromium slag | 28.5 | 24.9 | 13.8 | 9.5 | 0.91 | 6.5 | 7.4 | 10 | 25.3 |

TABLE 6-continued

|  | Cao (wt. %) | SiO$_2$ (wt. %) | Al$_2$O$_3$ (wt. %) | MgO (wt. %) | Total S (wt. %) | Total Fe (wt. %) | Total Cr (wt. %) | Porosity (%) | Cr$^{6+}$ Released (mg/liter)[1] |
|---|---|---|---|---|---|---|---|---|---|
| Slag of molten sewage sludge | 10.5 | 47.5 | 20.2 | 3.0 | 2.5 | 5.2 | 1.6 | 8 | 0.80 |
| Stainless steel slag-adhered refractory waste | 9.5 | 13.2 | 24.4 | 37.1 | 0.08 | 4.5 | 0.3 | — | 0.12 |

Note:
[1] Metal release test in the Notification No. 46 of the Environment Agency of Japan.

TABLE 7-1

|  | Sample Processed | | Non-aged, Gradually-cooled Blast Furnace Slag | | Processing Method | A[2] | Cr$^{6+}$ Released (mg/liter)[1] | |
|---|---|---|---|---|---|---|---|---|
|  | Type | Grain Size (mm) | Amount Added (wt. %) | Grain Size (mm) | | | Before Treatment | After Treatment |
| Comparative Sample 7 | stainless steel slag A | ~40 | 0 | — | Steamed at 100° C. for 3 days. | 0 | 6.5 | 5.20 |
| Comparative Sample 8 | stainless steel slag A | ~40 | 10 | ~25 | Steamed at 100° C. for 2 days. | 0.15 | 6.5 | 0.25 |
| Comparative Sample 9 | stainless steel slag B | ~25 | 10 | ~25 | Steamed at 100° C. for 3 days. | 0.03 | 32.7 | 1.31 |
| Comparative Sample 10 | stainless steel slag C | ~40 | 20 | ~25 | Steamed at 100° C. for 3 days. | 0.15 | 13.2 | 1.52 |
| Comparative Sample 11 | chromium slag | ~25 | 10 | ~25 | Steamed at 100° C. for 3 days. | 0.04 | 25.3 | 1.95 |

Notes:
[1] Metal release test in the Notification No. 46 of the Environment Agency of Japan.
[2] A in formula (1).

TABLE 7-2

|  | Sample Processed | | Non-aged, Gradually-cooled Blast Furnace Slag | | Additive | | Processing Method | A[2] | Cr$^{6+}$ Released (mg/liter)[1] | |
|---|---|---|---|---|---|---|---|---|---|---|
|  | Type | Grain Size (mm) | Amount Added (wt. %) | Grain Size (mm) | Type | Amount Added (wt. %) | | | Before Treatment | After Treatment |
| Sample A18 of the Invention | stainless steel slag A | ~40 | 0 | — | sulfur | 0.5 | Steamed at 100° C. for 2 days. | 0.38 | 6.50 | <0.05 |
| Sample A19 of the Invention | stainless steel slag A | ~40 | 0 | — | sinter[5] | 2 | Steamed at 100° C. for 2 days. | 1.54 | 6.50 | <0.05 |
| Sample A20 of the Invention | stainless steel slag B | ~40 | 0 | — | sulfur | 2 | Steamed at 100° C. for 3 days. | 0.31 | 32.7 | <0.05 |
| Sample A21 of the Invention | chromium slag | ~25 | 0 | — | sulfur | 2 | Steamed at 100° C. for 3 days. | 0.40 | 25.3 | <0.05 |
| Sample A22 of the Invention | slag of molten sewage sludge | ~25 | 0 | — | sulfur | 0.5 | Steamed at 100° C. for 2 days. | 3.13 | 0.80 | <0.05 |
| Sample A23 of the Invention | stainless steel slag-adhered refractory waste | ~40 | 0 | — | sulfur | 0.5 | Steamed at 100° C. for 1 day. | 20.8 | 0.12 | <0.05 |
| Sample A24 of the Invention | stainless steel slag B | ~25 | 5 | ~25 | sulfur | 1 | Steamed at 100° C. for 3 days. | 0.17 | 32.7 | <0.05 |

TABLE 7-2-continued

| | Sample Processed | | Non-aged, Gradually-cooled Blast Furnace Slag | | Additive | | | | $Cr^{6+}$ Released (mg/liter)[1] | |
|---|---|---|---|---|---|---|---|---|---|---|
| | Type | Grain Size (mm) | Amount Added (wt. %) | Grain Size (mm) | Type | Amount Added (wt. %) | Processing Method | A[2] | Before Treatment | After Treatment |
| Sample A25 of the Invention | stainless steel slag C | ~40 | 5 | ~25 | sulfur | 1 | Steamed at 100° C. for 3 days. | 0.42 | 13.2 | <0.05 |
| Sample A26 of the Invention | chromium slag | ~25 | 5 | ~25 | sulfur | 1 | Steamed at 100° C. for 3 days. | 0.22 | 25.3 | <0.05 |

Notes:
[1] Metal release test in the Notification No. 46 of the Environment Agency of Japan.
[2] A in formula (1).
[5] Sinter as purified from a hot spring from Kusazu Hot Spring Resort, Gunma-ken, Japan (this has a total sulfur content of 27 wt. %).

EXAMPLE A3

The same chromium oxide-containing substances as in Example A2 were processed under different immersion conditions shown in Table 8.

As sulfur-containing substances, there were used herein blast furnace slag-released water, elementary sulfur, sinter, hydrogen sulfide, and sodium thiosulfate; and as a divalent iron-containing compound, there was used ferrous sulfate.

In Table 8, there are shown the experimental data obtained along with the conditions employed.

As for comparative samples A12 to A15 in Table 8, which were immersed in blast furnace slag-released water having a reducing sulfur concentration of 0.03% by weight for 3 to 5 days, the amount of $Cr^{6+}$ released from the processed samples was reduced, but still was not less than 0.05 mg/liter.

In contrast to those comparative samples, samples A27 to A31 of the invention were immersed in blast furnace slag-released water, to which or over which had been added or sprayed any of elemental sulfur, sinter, sodium thiosulfate and hydrogen sulfate (that is, any of elemental sulfur-containing substances or compounds of sulfur having a valence less than 6) thereby to control the reducing sulfur content of the resulting water, for 5 days or less. As a result, the amount of $Cr^{6+}$ released from those processed samples of the invention was less than 0.05 mg/liter.

As for sample A32 of the invention, it was immersed in blast furnace slag-released water, to which had been added ferrous sulfate, for 3 days. The amount of $Cr^{6+}$ released from this sample A32 was also less than 0.05 mg/liter.

TABLE 8-1

| | Sample Processed | | Non-aged, Gradually-cooled Blast Furnace Slag | | | | | $Cr^{6+}$ Released (mg/liter)[1] | |
|---|---|---|---|---|---|---|---|---|---|
| | Type | Grain Size (mm) | Amount Added (wt. %) | Grain Size (mm) | Processing Method | | A[2] | Before Treatment | After Treatment |
| Comparative Sample A12 | stainless steel slag A | ~40 | 0 | — | Immersed in blast furnace slag-released water[4] of 0.5 times the weight of the sample, for 3 days. | | 0 | 6.50 | 1.76 |
| Comparative Sample A13 | stainless steel slag B | ~25 | 0 | — | Immersed in blast furnace slag-released water[4] of 3.0 times the weight of the sample, for 3 days. | | 0 | 32.7 | 6.13 |
| Comparative Sample A14 | slag of molten sewage sludge | ~25 | 0 | — | Immersed in blast furnace slag-released water[4] of 0.5 times the weight of the sample, for 5 days. | | 0 | 0.80 | 0.35 |
| Comparative Sample A15 | stainless steel slag-adhered refractory waste | ~40 | 0 | — | Immersed in blast furnace slag-released water[4] of 0.5 times the weight of the sample, for 3 days. | | 0 | 0.12 | 0.06 |

Notes:
[1] Metal release test in the Notification No. 46 of the Environment Agency of Japan.
[2] A in formula (1).
[3] The reducing sulfur concentration in the blast furnace slag-released water used was 0.3% by weight.

TABLE 8-2

| | Sample Processed | | Non-aged, Gradually-cooled Blast Furnace Slag | | | | $Cr^{6+}$ Released (mg/liter)[1] | |
|---|---|---|---|---|---|---|---|---|
| | Type | Grain Size (mm) | Amount Added (wt. %) | Grain Size (mm) | Processing Method | $A^{2)}$ | Before Treatment | After Treatment |
| Sample A27 of the Invention | stainless steel slag A | ~40 | 0 | — | Immersed in blast furnace slag-released water[6] of 0.5 times the weight of the sample, to which had been added sinter[7] to make the water have a reducing sulfur concentration of 1 g/liter, for 3 days. | 0 | 6.50 | <0.05 |
| Sample A28 of the Invention | stainless steel slag A | ~40 | 0 | — | Immersed in blast furnace slag-released water[6] of 0.5 times the weight of the sample, over which had been sprayed hydrogen sulfide to make the water have a reducing sulfur concentration of 2 g/liter, for 3 days. | 0 | 6.50 | <0.05 |
| Sample A29 of the Invention | stainless steel slag B | ~25 | 0 | — | Immersed in blast furnace slag-released water[6] of 0.5 times the weight of the sample, to which had been added sodium thiosulfate to make the water have a reducing sulfur concentration of 10 g/liter, for 5 days. | 0 | 32.7 | <0.05 |
| Sample A30 of the Invention | slag of molten sewage sludge | ~25 | 0 | — | Immersed in blast furnace slag-released water[6] of 0.5 times the weight of the sample, to which had been added sulfur to make the water have a reducing sulfur concentration of 0.4 g/liter, for 3 days. | 0 | 0.80 | <0.05 |
| Sample A31 of the Invention | stainless steel slag-adhered refractory waste | ~40 | 0 | — | Immersed in blast furnace slag-released water[6] of 0.4 times the weight of the sample, to which had been added sulfur to make the water have a reducing sulfur concentration of 0.4 g/liter, for 3 days. | 0 | 0.12 | <0.05 |
| Sample A32 of the Invention | stainless steel slag A | ~40 | 0 | — | Immersed in blast furnace slag-released water[6] of 0.5 times the weight of the sample, to which had been added ferrous sulfate, for 3 days. | 0 | 6.50 | <0.05 |

Notes:
[1] Metal release test in the Notification No. 46 of the Environment Agency of Japan.
[2] A in formula (1).
[6] The reducing sulfur concentration in the blast furnace slag-released water used was 0.03% by weight.
[7] Sinter as purified from a hot spring from Kusazu Hot Spring Resort, Gunma-ken, Japan (this has a total sulfur content of 20 wt. %).

EXAMPLE B

As chromium oxide-containing substances which are to be reduced herein, there were used stainless steel slag, chromium slag as discharged during the production of sodium bichromate, and slag of molten sewage sludge.

The stainless steel slag is one produced in a stainless steel refining process operated under such conditions that the slag discharged contains releasable $Cr^{6+}$.

Table 9 shows the chemical compositions of the samples of stainless steel slag, chromium slag and slag of molten sewage sludge tested herein, the porosity of each sample, and the amount of $Cr^{6+}$ released from each sample.

As in Table 9, the amount of $Cr^{6+}$ released from each sample of stainless steel slag, chromium slag, slag A of molten sewage sludge (porosity: 8%), and slag B of molten sewage sludge (porosity: 2%) was 10.5 mg/liter, 25.3 mg/liter, 0.8 mg/liter and 0.27 mg/liter, respectively.

Those slag samples to be reduced were processed under the various conditions shown in Table 10. The amount of $Cr^{6+}$ released from each of the thus-processed sample was measured.

The data obtained are shown in Table 10.

The amount of each slag sample processed was 100 tons/batch. Blast furnace slag-released water was used herein, which is water that has been sprayed over hot, non-aged blast furnace slag. This had a total sulfur concentration of 0.50% by weight.

Steam was introduced into each sample from below, and its temperature was 100° C.

As in Table 10, even though non-aged blast furnace slag-released water was sprayed over comparative sample B1, stainless steel slag which released 10.5 mg/liter of $Cr^{6+}$ prior to the treatment, the amount of $Cr^{6+}$ released from the thus-processed sample B1 was still not less than the environmentally acceptable standard value of 0.05 mg/liter.

As for comparative samples B2 to B5, stainless steel slag, chromium slag and slag of molten sewage sludge, even though these were immersed in non-aged blast furnace slag-released water for 7 days, the amount of $Cr^{6+}$ released from the thus-processed samples was still not less than 0.05 mg/liter.

In contrast to those comparative samples, samples B1 to B9 of the invention were processed by steaming them followed by spraying thereover non-aged blast furnace slag-released water, or by steaming them followed by immersing them in non-aged blast furnace slag-released water. As a result, the amount of $Cr^{6+}$ released from the thus-processed samples of the invention was less than the environmentally acceptable standard value of 0.05 mg/liter.

Although samples B1 to B9, stainless steel slag, chromium slag and slag of molten sewage sludge, which had been reduced herein according to the invention, were kept in air for 1 year, they released no $Cr^{6+}$.

TABLE 9

| | CaO (wt. %) | SiO₂ (wt. %) | Al₂O₃ (wt. %) | MgO (wt. %) | Total S (wt. %) | Total Fe (wt. %) | Total Cr (wt. %) | Porosity (%) | Cr6+ Released (mg/liter)(*) |
|---|---|---|---|---|---|---|---|---|---|
| Stainless Steel Slag | 59.2 | 17.3 | 4.2 | 3.5 | 0.03 | 4.1 | 5.7 | 14 | 10.5 |
| Chromium Slag | 28.5 | 24.9 | 13.8 | 9.5 | 0.91 | 6.5 | 7.4 | 10 | 25.3 |
| Slag A of Molten Sewage Sludge | 10.5 | 47.5 | 20.2 | 3.0 | 2.5 | 5.2 | 1.6 | 8 | 0.80 |
| Slag B of Molten Sewage Sludge | 10.5 | 47.5 | 20.2 | 3.0 | 2.5 | 5.2 | 1.6 | 2 | 0.27 |

(*): Metal release test in the Notification No. 46 of the Environment Agency of Japan.

TABLE 10

| | Sample Processed | | | $Cr^{6+}$ Released (mg/liter)[1] | |
|---|---|---|---|---|---|
| | Type | Grain Size (mm) | Processing Method | Before Treatment | After Treatment |
| Comparative sample B1 | stainless steel slag | ~25 | Sprayed with blast furnace slag-released water of 0.1 times the weight of the sample, at intervals of 5 days for a total of 10 times. | 10.5 | 2.21 |
| Comparative sample B2 | stainless steel slag | ~25 | Immersed in blast furnace slag-released water of 5 times the weight of the sample, for 7 days. | 10.5 | 0.80 |
| Comparative sample B3 | chromium slag | ~25 | Immersed in blast furnace slag-released water of 5 times the weight of the sample, for 7 days. | 25.3 | 4.36 |
| Comparative sample B4 | slag A of molten sewage sludge | ~5 | Immersed in blast furnace slag-released water of the same weight as that of the sample, for 7 days. | 0.80 | 0.37 |
| Comparative sample B5 | slag B of molten sewage sludge | ~5 | Immersed in blast furnace slag-released water of the same weight as that of the sample, for 7 days. | 0.27 | 0.10 |
| Comparative sample B6 | stainless steel slag | ~25 | Steamed at 100° C. for 24 hours. | 10.5 | 14.2 |
| Comparative sample B7 | chromium slag | ~25 | Steamed at 100° C. for 24 hours. | 25.3 | 32.4 |
| Comparative sample B8 | slag A of molten sewage sludge | ~5 | Steamed at 100° C. for 24 hours. | 0.80 | 0.98 |
| Comparative sample B9 | slag B of molten sewage sludge | ~5 | Steamed at 100° C. for 24 hours. | 0.27 | 0.98 |
| Sample B1 of the invention | stainless steel slag | ~25 | Steamed at 100° C. for 24 hours, and then sprayed once with blast furnace slag-released water of 0.1 times the weight of the sample. | 10.5 | <0.05 |
| Sample B2 of the Invention | stainless steel slag | ~25 | Steamed at 100° C. for 24 hours, and then immersed in blast furnace slag-released water of 0.5 times the weight of the sample for 1 day. | 10.5 | <0.05 |
| Sample B3 of the Invention | stainless steel slag | ~40 | Steamed at 100° C. for 72 hours, and then immersed in blast furnace slag-released water of 0.5 times the weight of the sample for 5 days. | 10.5 | <0.05 |
| Sample B4 of the Invention | chromium slag | ~25 | Steamed at 100° C. for 24 hours, and then sprayed with blast furnace slag-released water of 0.1 times the weight of the sample at intervals of 5 days for a total of 3 times. | 25.3 | <0.05 |
| Sample B6 of the Invention | slag A of molten sewage sludge | ~5 | Steamed at 100° C. for 72 hours, and then immersed in blast furnace slag-released water of 0.5 times the weight of the sample for 5 days. | 0.80 | <0.05 |
| Sample B7 of the Invention | slag A of molten sewage sludge | ~5 | Steamed at 100° C. for 24 hours, and then sprayed once with blast furnace slag-released water of 0.1 times the weight of the sample. | 0.80 | <0.05 |
| Sample B8 of the Invention | slag B of molten sewage sludge | ~5 | Steamed at 100° C. for 72 hours, and then immersed in blast furnace slag-released water of 0.5 times the weight of the sample for 5 days. | 0.27 | <0.05 |
| Sample B9 of the Invention | slag B of molten sewage sludge | ~5 | Steamed at 100° C. for 24 hours, and then sprayed once with blast furnace slag-released water of 0.1 times the weight of the sample. | 0.27 | <0.05 |

Notes:
[1] Metal release test in the Notification No. 46 of the Enviromnent Agency of Japan. The total sulfur content of the blast furnace slag-released water used was 0.50% by weight.

EXAMPLE C

Comparative Samples C1 and C2

As chromium oxide-containing substances, there were used herein (1) stainless steel slag, and (2) stainless steel slag-adhered refractory.

The stainless steel slag is one produced during reduction in the course of refining stainless steel.

The amount of $Cr^{6+}$ released from these chromium oxide-containing substances is as follows:

(1) Stainless steel slag: 10.5 mg/liter
(2) Stainless steel slag-adhered refractory: 0.12 mg/liter These chromium oxide-containing substances were reduced according to the method C or D shown in Table 11.

In Table 12, there is shown the rejection rate of the reduced samples, from which the amount of $Cr^{6+}$ released was more than 0.05 mg/liter, along with the reducing method employed.

As in Table 12, the rejection rate of the reduced samples of stainless steel slag and stainless steel slag-adhered refractory, from which the amount of $Cr^{6+}$ released was more than 0.05 mg/liter, namely 0.10%.

Comparative Samples C3 to C6

As chromium oxide-containing substances, there were used herein the same stainless steel slag and stainless steel slag-adhered refractory as in comparative samples C1 and C2, and chromium slag and slag of molten sewage sludge.

The amount of $Cr^{6+}$ released from the latter two chromium oxide-containing substances is as follows:

(1) Chromium slag: 25.3 mg/liter
(2) Slag of molten sewage sludge: 0.80 mg/liter These chromium oxide-containing substances were reduced according to the method B, C or D shown in Table 11.

0.05 or 0.09 part by weight of aged, gradually-cooled blast furnace slag, or slag as discharged in the pre-treatment of molten pig iron, was added to 100 parts by weight of each of the thus-reduced chromium oxide-containing substances, and mixed.

Regarding the sulfur content of the aged, gradually-cooled blast furnace slag used herein, the total of elementary sulfur and sulfur of sulfur compounds in the slag was 0.85% by weight, and the total of elementary sulfur and sulfur having a valence less than 6 therein was 0.42% by weight.

Regarding the sulfur content of the slag as discharged in the pre-treatment of molten pig iron, which was also used herein, the total of elementary sulfur and sulfur of sulfur compounds in the slag was 0.40% by weight, and the total of elementary sulfur and sulfur having a valence less than 6 therein was 0.12% by weight.

In Table 12, there is shown the rejection rate of the mixture samples, in which the amount of $Cr^{6+}$ released was more than 0.05 mg/liter, along with the reducing method employed, and the type and the amount of the sulfur-containing slag added.

As shown in Table 12, when the sulfur-containing slag was added to the reduced chromium oxide-containing substance in an amount of less than 0.1 parts by weight, relative to 100 parts by weight of the reduced chromium oxide-containing substance, the rejection rate of the mixture samples, in which the amount of $Cr^{6+}$ released was over 0.05 mg/liter, was 0.05%.

Sample C1 of the Invention

The same stainless steel slag as that in comparative sample C1 was reduced according to the method C shown in Table 11.

0.1 part by weight of aged, gradually-cooled blast furnace slag was added to 100 parts by weight of the thus-reduced stainless steel slag, and mixed.

Regarding the sulfur content of the aged, gradually-cooled blast furnace slag used herein, the total of elementary sulfur and sulfur of sulfur compounds in the slag was 0.85% by weight, and the total of elementary sulfur and sulfur having a valence less than 6 therein was 0.42% by weight.

As shown in Table 12, the rejection rate of the mixture samples, from which the amount of $Cr^{6+}$ released was more than 0.05 mg/liter, was 0.00%.

Samples C2 to C24 of the Invention

As chromium oxide-containing substances, there were used herein (1) stainless steel slag, (2) stainless steel slag-adhered refractory, (3) chromium slag, and (4) slag of molten sewage sludge.

The amount of $Cr^{6+}$ released from these chromium oxide-containing substances is as follows:

(1) Stainless steel slag: 10.5 mg/liter
(2) Stainless steel slag-adhered refractory: 0.12 mg/liter
(3) Chromium slag: 25.3 mg/liter
(4) Slag of molten sewage sludge: 0.80 mg/liter These chromium oxide-containing substances were reduced according to the method A, B, C or D shown in Table 11. From 0.1 to 90 parts by weight of aged, gradually-cooled blast furnace slag, or slag as discharged in the pre-treatment of molten pig iron, was added to 100 parts by weight of each of the thus-reduced chromium oxide-containing substances, and mixed.

Regarding the sulfur content of the aged, gradually-cooled blast furnace slag used herein, the total of elementary sulfur and sulfur of sulfur compounds in the slag was 0.85% by weight, and the total of elementary sulfur and sulfur having a valence less than 6 therein was 0.42% by weight.

Regarding the sulfur content of the slag as discharged in the pre-treatment of molten pig iron, which was also used herein, the total of elementary sulfur and sulfur of sulfur compounds in the slag was 0.40% by weight, and the total of elementary sulfur and sulfur having a valence less than 6 therein was 0.12% by weight.

In Table 12, there is shown the rejection rate of the mixture samples, from which the amount of $Cr^{6+}$ released was more than 0.05 mg/liter, along with the reducing method employed, and the type and the amount of the sulfur-containing slag added.

As shown in Table 12, the rejection rate of the mixture samples, from which the amount of $Cr^{6+}$ released was more than 0.05 mg/liter, was 0.00%. Comparing the samples of the invention with the comparative samples, it will be seen that the rejection rate of the former is significantly lower than that of the latter, namely from 0.05 to 0.10%. The rejection rate as referred to herein is one parameter in recycling chromium oxide-containing wastes as materials in roadbeds, materials in temporary works, fillers in civil engineering reclamation works and the like.

In this Example, non-aged, gradually-cooled blast furnace slag, and blast furnace slag-released water were used for reducing the chromium oxide-containing substances prior to adding the sulfur-containing slag to the reduced substances. In the present invention, however, the reduction of chromium oxide-containing substances is not specifically defined.

TABLE 11

Reduction of Chromium Oxide-containing Substances before Addition thereto of Sulfur-containing Slag A Mixed with non-aged, gradually-cooled blast furnace slag, and then sprayed with water.
B Immersed in blast furnace slag-released water for 1 week.

TABLE 11-continued

Reduction of Chromium Oxide-containing Substances before Addition thereto of Sulfur-containing Slag C Mixed with non-aged, gradually-cooled blast furnace slag, and then steamed at 100° C. for 24 hours.
D Sprayed with blast furnace slag-released water.

TABLE 12

| | Sample Processed | Reduction before Mixed with Sulfur-containing Slag(*) | Sulfur-containing Slag Added | | Rejection Ratio (%) (***) |
|---|---|---|---|---|---|
| | | | Type | Amount Added (wt. pts.) (**) | |
| Comparative Sample C1 | stainless steel slag | C | none | 0 | 0.10 |
| Comparative Sample C2 | stainless steel slag-adhered refractory | D | none | 0 | 0.10 |
| Comparative Sample C3 | stainless steel slag | C | aged, gradually-cooled blast furnace slag | 0.05 | 0.05 |
| Comparative Sample C4 | stainless steel slag-adhered refractory | D | slag as discharged in pre-treatment of pig iron melt | 0.09 | 0.05 |
| Comparative Sample C5 | chromium slag | C | aged, gradually-cooled blast furnace slag | 0.05 | 0.05 |
| Comparative Sample C6 | slag of molten sewage sludge | B | slag as discharged in pre-treatment of pig iron melt | 0.09 | 0.05 |
| Sample C1 of the Invention | stainless steel slag | C | aged, gradually-cooled blast furnace slag | 0.1 | 0.00 |
| Sample C2 of the Invention | stainless steel slag-adhered refractory | D | slag as discharged in pre-treatment of pig iron melt | 0.1 | 0.00 |
| Sample C3 of the Invention | chromium slag | C | aged, gradually-cooled blast furnace slag | 0.1 | 0.00 |
| Sample C4 of the Invention | slag of molten sewage sludge | B | slag as discharged in pre-treatment of pig iron melt | 0.1 | 0.00 |
| Sample C5 of the Invention | stainless steel slag | D | aged, gradually-cooled blast furnace slag | 5.0 | 0.00 |
| Sample C6 of the Invention | stainless steel slag-adhered refractory | D | slag as discharged in pre-treatment of pig iron melt | 5.0 | 0.00 |
| Sample C7 of the Invention | chromium slag | D | aged, gradually-cooled blast furnace slag | 5.0 | 0.00 |
| Sample C8 of the Invention | slag of molten sewage sludge | D | slag as discharged in pre-treatment of pig iron melt | 5.0 | 0.00 |
| Sample C9 of the Invention | stainless steel slag | B | aged, gradually-cooled blast furnace slag | 0.1 | 0.00 |
| Sample C10 of the Invention | stainless steel slag-adhered refractory | B | slag as discharged in pre-treatment of pig iron melt | 0.1 | 0.00 |
| Sample C11 of the Invention | chromium slag | B | aged, gradually-cooled blast furnace slag | 0.1 | 0.00 |
| Sample C12 of the Invention | slag of molten sewage sludge | A | slag as discharged in pre-treatment of pig iron melt | 0.1 | 0.00 |
| Sample C13 of the Invention | stainless steel slag | B | aged, gradually-cooled blast furnace slag | 5.0 | 0.00 |
| Sample C14 of the Invention | stainless steel slag-adhered refractory | B | slag as discharged in pre-treatment of pig iron melt | 5.0 | 0.00 |
| Sample C15 of the Invention | chromium slag | B | aged, gradually-cooled blast furnace slag | 5.0 | 0.00 |

TABLE 12-continued

| | Sample Processed | Reduction before Mixed with Sulfur-containing Slag(*) | Sulfur-containing Slag Added | | Rejection |
| --- | --- | --- | --- | --- | --- |
| | | | Type | Amount Added (wt. pts.) () | Ratio (%) (*) |
| Sample C16 of the Invention | slag of molten sewage sludge | B | slag as discharged in pre-treatment of pig iron melt | 5.0 | 0.00 |
| Sample C17 of the Invention | stainless steel slag | C | aged, gradually-cooled blast furnace slag | 2.0 | 0.00 |
| Sample C18 of the Invention | stainless steel slag-adhered refractory | C | slag as discharged in pre-treatment of pig iron melt | 2.0 | 0.00 |
| Sample C19 of the Invention | chromium slag | C | aged, gradually-cooled blast furnace slag | 2.0 | 0.00 |
| Sample C20 of the Invention | slag of molten sewage sludge | C | slag as discharged in pre-treatment of pig iron melt | 2.0 | 0.00 |
| Sample C21 of the Invention | stainless steel slag | C | slag as discharged in pre-treatment of pig iron melt | 90 | 0.00 |
| Sample C22 of the Invention | stainless steel slag-adhered refractory | B | slag as discharged in pre-treatment of pig iron melt | 90 | 0.00 |
| Sample C23 of the Invention | chromium slag | C | aged, gradually-cooled blast furnace slag | 90 | 0.00 |
| Sample C24 of the Invention | slag of molten sewage sludge | A | aged, gradually-cooled blast furnace slag | 90 | 0.00 |

Notes:
*See Table 11.
**Parts by weight, relative to 100 parts by weight of the reduced chromium oxide-containing substance.
***Rejection ratio of samples as reduced and mixed with sulfur-containing slag, from which the amount of $Cr^{6+}$ released was over 0.05 mg/liter.

Although the invention has been described in detail and with reference to specific embodiments thereof, it will be apparent to one skilled in the art that various changes and modifications can be made therein without departing from the spirit and scope thereof.

What is claimed is:

1. A method for processing chromium oxide-containing substances, comprising the steps of:

mixing and contacting a reducing substance having therein at least one member selected from the group consisting of sulfur and compounds of sulfur having a valence less than 6 with chromium oxide-containing substances to form a resulting mixture; and applying steam to the resulting mixture;

wherein the mixing and contacting of the selected reducing substance with the chromium oxide-containing substances to form the mixture and the subsequent application of steam to the resulting mixture is controlled without increasing the volume of the processed slag, resulting in that the release of $Cr^{6+}$ from the chromium oxide-containing substances in the thus-processed slag is prevented.

2. The method for processing chromium oxide-containing substances as claimed in claim 1, wherein slag is the reducing substance.

3. The method of claim 1, wherein said step of steaming is performed at a temperature of up to about 200° C. using a vapor.

4. The method for processing chromium oxide-containing substances as claimed in claim 2, wherein, said mixture is, prior to the applying steam step, further mixed with other reducing substances that contain said at least one member.

5. The method for processing chromium oxide-containing substances as claimed in claim 1, wherein non-aged, gradually-cooled blast furnace slag is the selected reducing substance.

6. The method for processing chromium oxide-containing substances as claimed in claim 1, wherein, prior to said mixing step, steam is applied to said chromium oxide-containing substances.

* * * * *